United States Patent
Oki et al.

(10) Patent No.: US 7,464,233 B2
(45) Date of Patent: Dec. 9, 2008

(54) DATA INPUT/OUTPUT METHOD IN INFORMATION PROCESSING SYSTEM, AND INFORMATION PROCESSING SYSTEM

(75) Inventors: Hiroshi Oki, Yokohama (JP); Hiroshi Suzuki, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 305 days.

(21) Appl. No.: 11/432,382

(22) Filed: May 12, 2006

(65) Prior Publication Data
US 2007/0220224 A1    Sep. 20, 2007

(30) Foreign Application Priority Data
Mar. 17, 2006  (JP)  ............... 2006-073726

(51) Int. Cl.
*G06F 12/00*    (2006.01)

(52) U.S. Cl. ............ 711/161; 711/4; 711/100; 711/114; 711/161; 711/162; 714/5; 714/6

(58) Field of Classification Search ............ 711/4, 711/100, 114, 161–162; 714/5–6
See application file for complete search history.

(56) References Cited

U.S. PATENT DOCUMENTS

| 6,976,139 B2* | 12/2005 | Halstead et al. ............. 711/161 |
| 7,159,087 B2* | 1/2007 | Shinozaki et al. ............ 711/162 |
| 2005/0262312 A1* | 11/2005 | Morishita et al. ........... 711/147 |

FOREIGN PATENT DOCUMENTS

JP    11-085408    9/1997

* cited by examiner

*Primary Examiner*—Sanjiv Shah
*Assistant Examiner*—Zhuo H Li
(74) *Attorney, Agent, or Firm*—Reed Smith LLP; Stanley P. Fisher, Esq.; Juan Carlos A. Marquez, Esq.

(57) ABSTRACT

An input/output method is provided which assures data consistency of a file spreading over a plurality of logically significant volumes or files distributed among a plurality of volumes. A storage subsystem at a main site handles as one group those input/output requests issued in a single process from a computer which call for data update on a plurality of logically significant volumes. The update request is executed on a plurality of volumes by group to implement the updating of volumes at a remote site en masse.

13 Claims, 26 Drawing Sheets

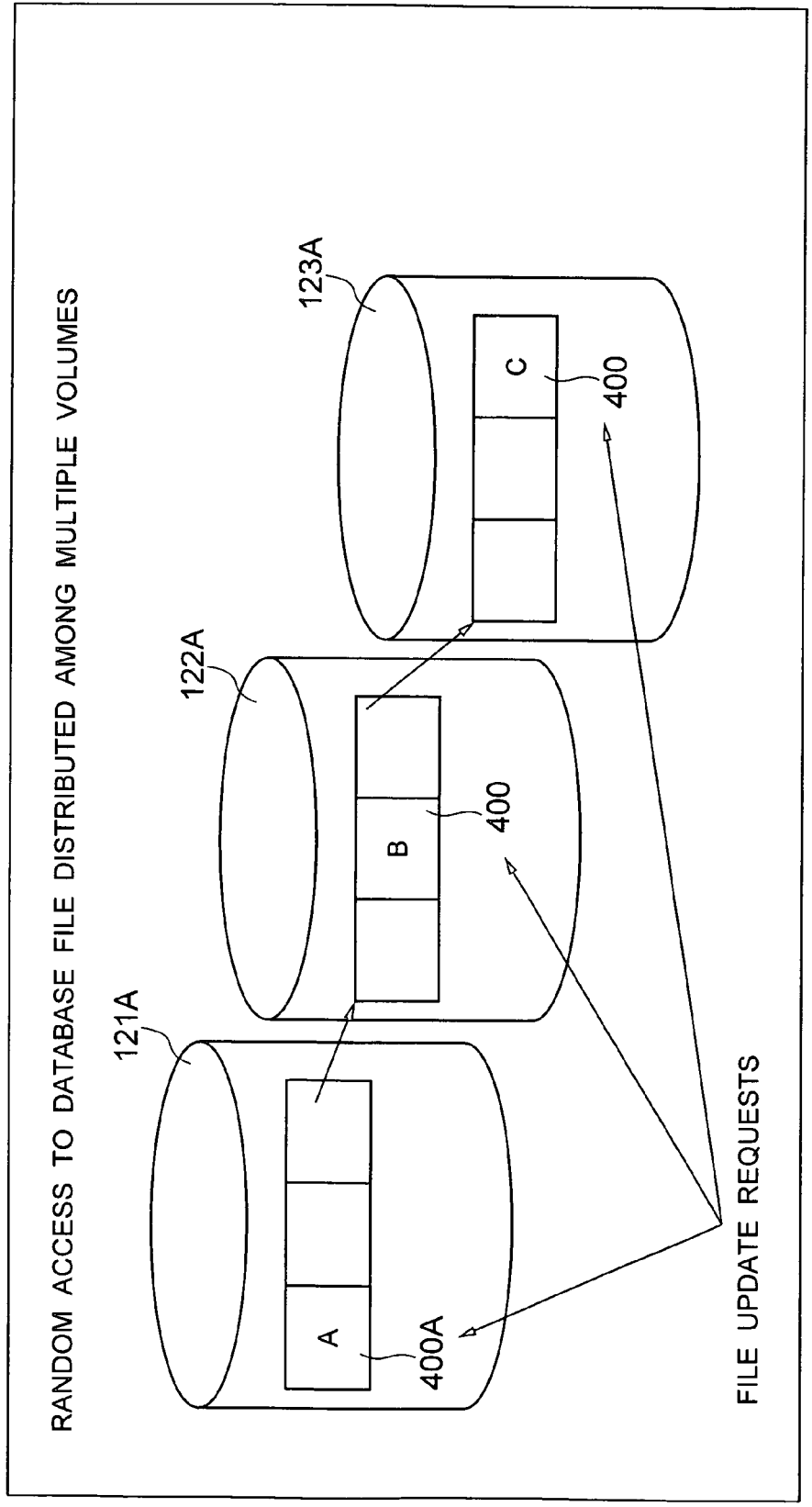

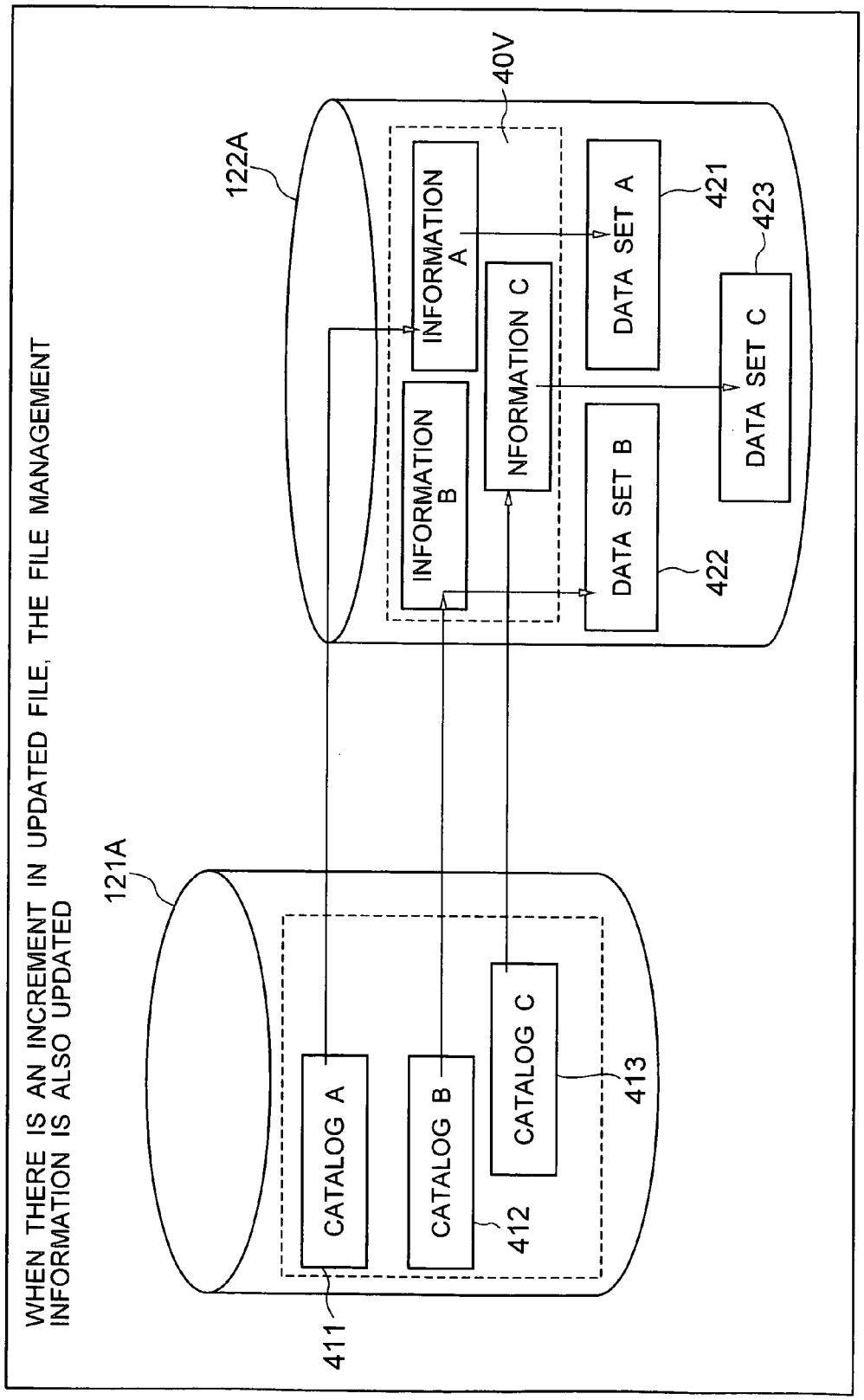

FIG. 5B

| PROCESS MANAGEMENT INFORMATION 550 | PROCESS 1 | ID INFORMATION OF PROCESS 1 | 550A |
| --- | --- | --- | --- |
| | | STATUS MANAGEMENT INFORMATION OF PROCESS 1 | 550B |
| | | PRIORITY INFORMATION OF PROCESS 1 | 550C |
| | | CONTROL INFORMATION OF PROCESS 1 | 550D |
| | | ADDRESS SPACE INFORMATION OF PROCESS 1 | 550E |
| | PROCESS 2 | ID INFORMATION OF PROCESS 2 | |
| | | STATUS MANAGEMENT INFORMATION OF PROCESS 2 | |
| | | PRIORITY INFORMATION OF PROCESS 2 | |
| | | CONTROL INFORMATION OF PROCESS 2 | |
| | | ADDRESS SPACE INFORMATION OF PROCESS 2 | |
| | ... | ... | |
| | PROCESS n | ID INFORMATION OF PROCESS n | |
| | | STATUS MANAGEMENT INFORMATION OF PROCESS n | |
| | | PRIORITY INFORMATION OF PROCESS n | |
| | | CONTROL INFORMATION OF PROCESS n | |
| | | ADDRESS SPACE INFORMATION OF PROCESS n | |

210B

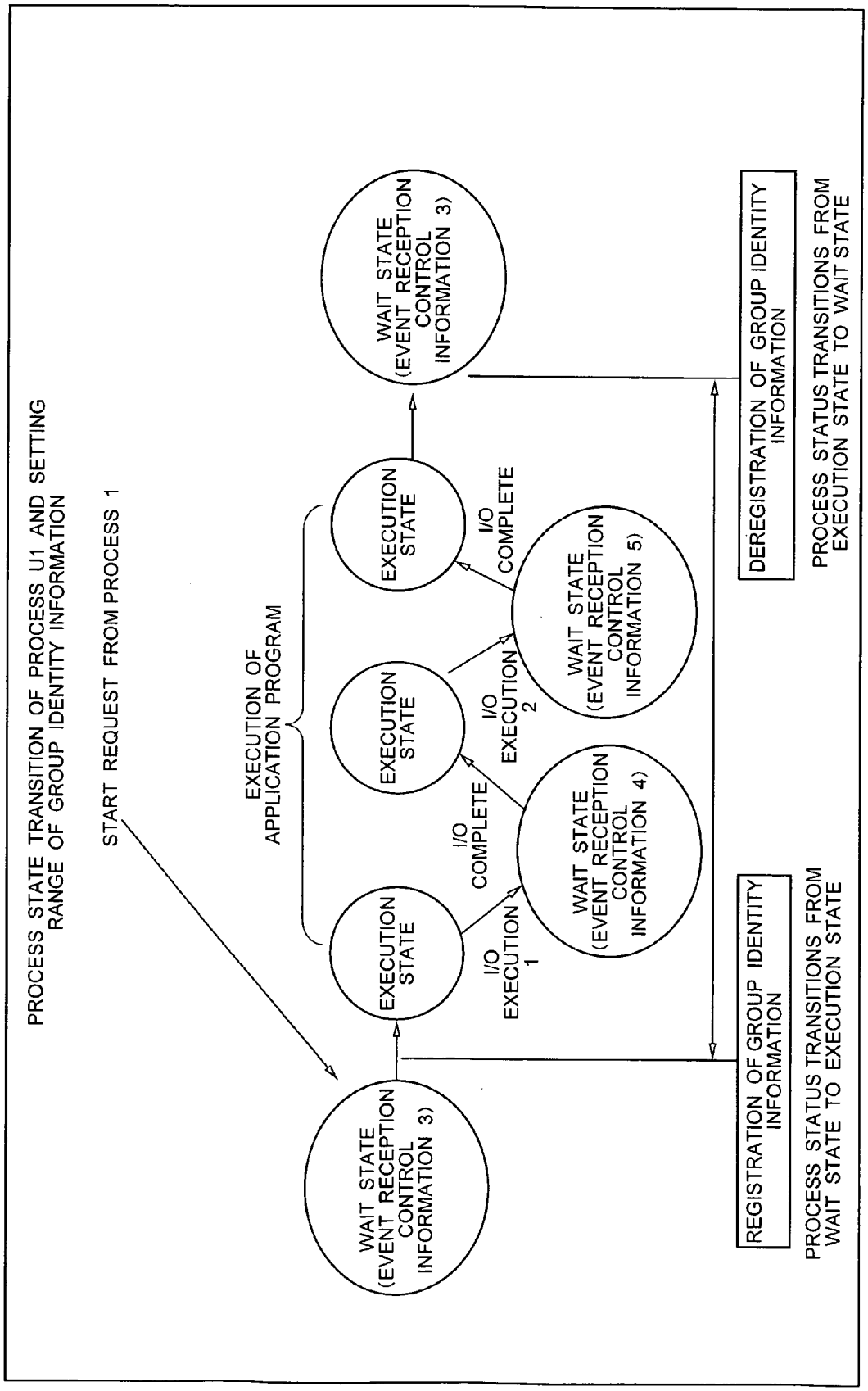

FIG. 9

| | | |
|---|---|---|
| CONTROL RULE 1 | UPDATE DATA GROUP ID REGISTRATION TRIGGER DEFINITION INFORMATION | 901 |
| | UPDATE DATA GROUP ID DEREGISTRATION TRIGGER DEFINITION INFORMATION | 902 |
| | OBJECT NAME | 903 |
| CONTROL RULE 2 | UPDATE DATA GROUP ID REGISTRATION TRIGGER DEFINITION INFORMATION | |
| | UPDATE DATA GROUP ID DEREGISTRATION TRIGGER DEFINITION INFORMATION | |
| | OBJECT NAME | |
| ⋮ | ⋮ | |
| CONTROL RULE n | UPDATE DATA GROUP ID REGISTRATION TRIGGER DEFINITION INFORMATION | |
| | UPDATE DATA GROUP ID DEREGISTRATION TRIGGER DEFINITION INFORMATION | |
| | OBJECT NAME | |

| | | |
|---|---|---|
| 290A | UPDATE DATA GROUP ID INFORMATION | PROCESS ID INFORMATION — 1001 |
| | | ADDRESS SPACE ID INFORMATION — 1002 |

FIG. 24

| DEFINITION OF UPDATE DATA GROUP ID REGISTRATION TRIGGER (2401) | DEFINITION OF UPDATE DATA GROUP ID DEREGISTRATION TRIGGER (2402) | OBJECT NAME (2403) |
|---|---|---|
| GENERATION OF PROCESS | ELIMINATION OF PROCESS | JOB NAME 1 |
| PROCESS CHANGE AT START OF TRANSACTION | PROCESS CHANGE AT END OF TRANSACTION | ONLINE SPACE NAME 1 |
| .. | .. | .. |
| GENERATION OF PROCESS | ELIMINATION OF PROCESS | JOB NAME n |

140

DATA INPUT/OUTPUT METHOD IN INFORMATION PROCESSING SYSTEM, AND INFORMATION PROCESSING SYSTEM

INCORPORATION BY REFERENCE

The present application claims priority from Japanese application JP 2006-073726 filed on Mar. 17, 2006, the content of which is hereby incorporated by reference into this application.

BACKGROUND OF THE INVENTION

The present invention relates to a technology for remote copying among storage subsystems.

Now that we live in an information society where the rapid spread of the Internet, the advent of broadband services and corporate mergers have all combined to complicate the operation and management of systems and where a huge volume of data is being handled, there is a growing demand for a system that can be restored quickly in the event of a disaster during a continuous operation 24 hours a day, 365 days a year. To meet this demand a technology is available which can make copied volumes (hereinafter referred to as sub-volumes) in storage subsystems located at remote places through communication lines. With this technology it is possible to recover data quickly from remote places and resume the system operation. Such a technology is disclosed in JP-A-11-85408 for example.

A currently available remote copying technique involves a computer sending update data to a local site and also to a remote site. This is done only for guaranteeing the data update for each input/output operation.

Thus, when an application program on the computer updates data files stored in a plurality of volumes and if the copy processing is interrupted by a communication line failure during the process of updating logically significant data, the data in the sub-volumes at a copy destination may become incomplete when seen from the application program even if the data update is guaranteed for each input/output operation.

In resuming service using the sub-volumes at the remote site having such invalid data, the data in the sub-volumes needs to be recovered using a journal on the application program side before the service can be resumed.

This invention therefore provides an information processing system that, in the remote copying process, can assure an updated data consistency for each process or task.

SUMMARY OF THE INVENTION

When an application program being executed in the host computer updates data stored in a logical volume, data update request generated by a process, a processing execution unit, is taken as one update group and information identifying the group is attached to an update request.

When an update request has information indicating the group, the storage subsystem at the remote site accumulates the update data associated with the update request in a disk controller at the remote site. When a group cancel command arrives, the storage subsystem reflects the accumulated update data on the volume.

As a result, even if the remote copy is interrupted by a communication failure, the updated data consistency on a plurality of volumes can be guaranteed. It is therefore possible to maintain the sub-volumes in a matching state when seen from the application program.

BRIEF DESCRIPTION OF THE DRAWINGS

FIG. 4A is a diagram showing an example of random access to a database file stored in a plurality of volumes.

FIG. 4B is a diagram showing another example of random access to a database file stored in a plurality of volumes.

FIG. 5B shows an example structure of process management information (process management information).

FIG. 6B is a state transition diagram showing a process state transition of a process U1 and a range of grouping.

FIG. 9 shows an example structure of an update data group ID control rule file 140.

FIG. 10 shows an example structure of update data group ID information.

FIG. 24 illustrates an example definition of the update data group ID control rule file.

DESCRIPTION OF THE EMBODIMENTS

Now, embodiments of this invention will be described by referring to the accompanying drawings. It is noted that the invention is not limited in any way to the following embodiments.

By adopting a part of the embodiments described below, a remote copy that guarantees data at a remote site for each process or task can be realized. Further, when a process or task updates data in a plurality of volumes, adopting a part of the embodiments can assure data in the multiple volumes. Other advantages and effects realized by this system will be described in the following embodiments.

Embodiment 1

Figure 1:
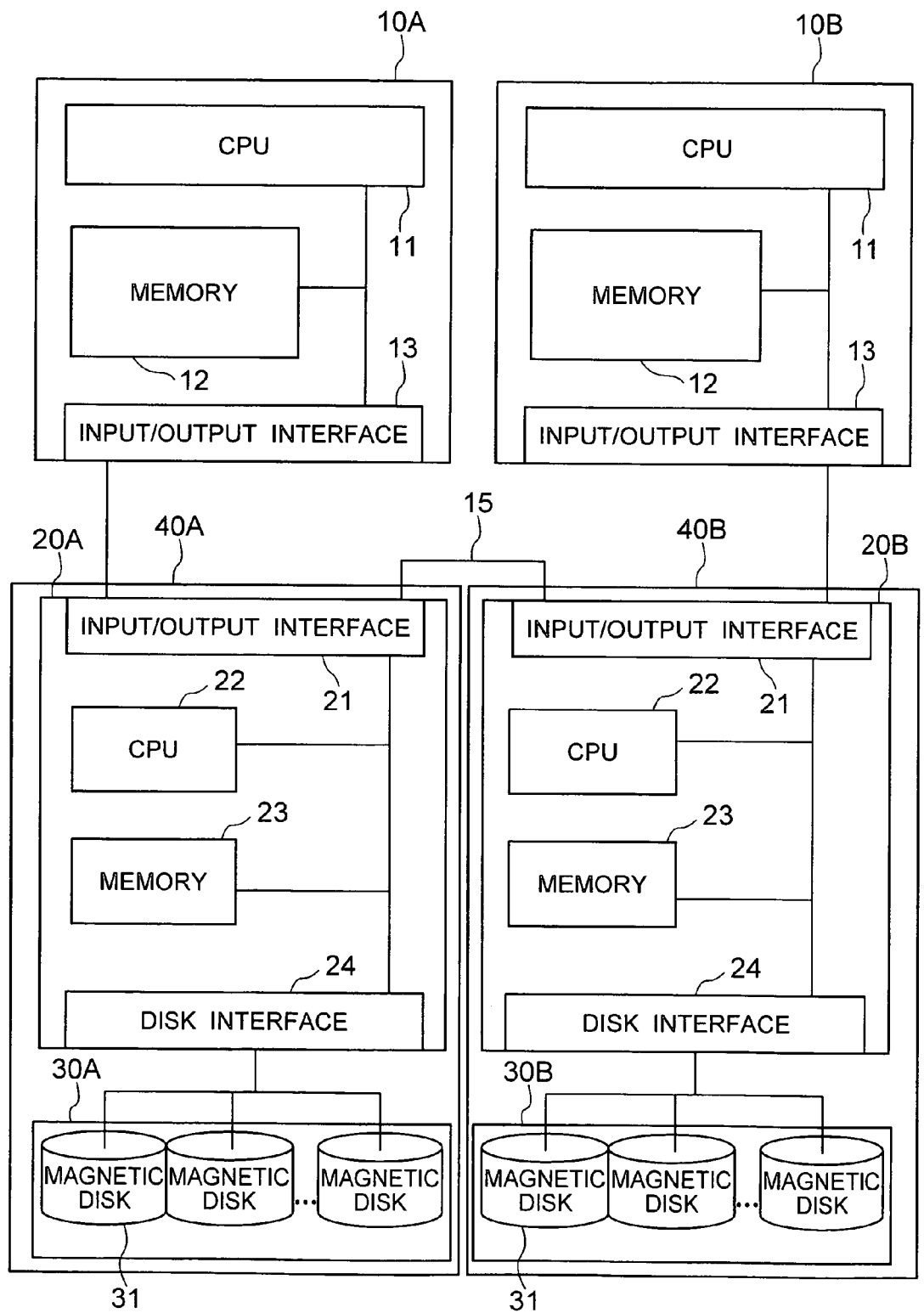
FIG. 1 is a block diagram showing a configuration of a computer system.

FIG. 1 is a block diagram showing a configuration of the information processing system as the first embodiment of this invention.

This information processing system comprises a host computer 10A at a main site and a storage subsystem 400A connected to the host computer 10A and having a disk controller 20A and a disk device 30A, and a host computer 10B at a remote site and a storage subsystem 400B connected to the host computer 10B and having a disk controller 20B and a disk device 30B. The storage subsystem 400A and the storage subsystem 400B are connected via a high-speed communication circuit.

The disk controller 20A at the main site and the disk controller 20B at the remote site are connected via communication circuit 15 capable of high-speed data transfer, such as LAN (Local Area Network) and SAN (Storage Area Network).

The host computer 10A issues to the disk controller 20A an input/output request for data stored in the disk device 30A. On receiving the input/output request, the disk controller 20A executes data read or write operations on the disk device 30A according to the request.

Similarly, the host computer 10B issues to the disk controller 20B an input/output request for data stored in the disk device 30B. On receiving the input/output request, the disk controller 20B executes data read or write operations on the disk device 30B according to the request.

Since the disk controller 20A at the main site and the disk controller 20B at the remote site are connected via the communication line, it is possible to generate at the remote site copied volumes of the main site disk device. Thus, during the restoration procedure following a system failure, the service that was being executed by the host computer 10A and the storage subsystem 400A made up of the disk controller 20A and the disk device 30A at the main site can be switched to the host computer 10B and the storage subsystem 400B made up of the disk controller 20B and the disk device 30B at the remote site. That is, the service and data that were being processed at the main site can be taken over by the remote site where their operations are resumed. The host computer 10B at the remote site has the same configuration as that of the host computer 10A at the main site.

The host computer 10A comprises a CPU 11, a memory 12 and an input/output interface 13. The CPU 11 executes programs stored in the memory 12 as required. The memory 12 stores the programs to run on the host computer 10A and data. The input/output interface 13 performs data transfer to and from the disk controller 20A.

The disk controller 20A comprises an input/output interface 21, a CPU 22, a memory 23 and a disk interface 24.

The input/output interface 21 performs a data transfer to and from the host computer 10A or to and from the disk controller 20B. The CPU 22 executes programs stored in the memory 23. The memory 23 stores the programs to run on the disk controller 20A and data.

The disk interface 24 performs data transfer to and from the disk device 30A.

The configurations of the host computer 10B, disk controller 20B and disk device 30B at the remote site are almost similar to those of the host computer 10A, disk controller 20A and disk device 30A.

Figure 2:
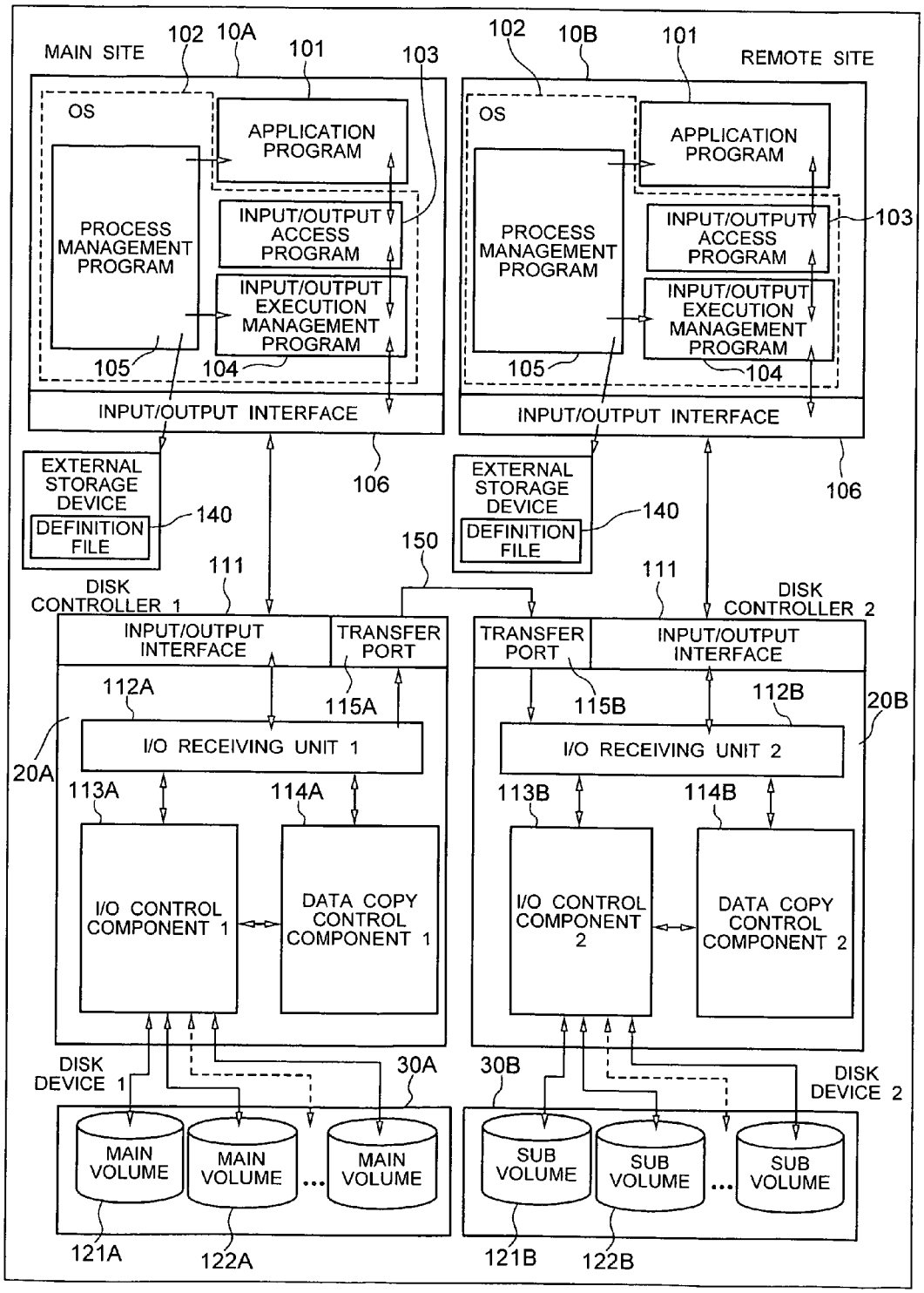
FIG. 2 is a block diagram showing functions of the computer system.

FIG. 2 is a functional block diagram of the information processing configured as described above.

Running on the host computer 10A at the main site are an application program 101 and an OS 102, which are stored in the memory 12 and read out and executed by the CPU 11 to realize desired functions.

The application program 101 makes data input/output requests to files located in a plurality of logical volumes set in the disk device 30A. The OS 102, upon receiving the requests from the application program 101, generates processes and schedules them by a process management program 105.

Here, the process refers to a unit of processing by which the application program or system management is executed, and is equivalent to a task. The logical volume means a manageable unit memory area of a storage medium, such as magnetic disk. The file is a collection of related data.

The scheduled process, when allocated with a resource of the CPU, enters an execution state. The control of an input/output request from the application program is handed over to the input/output access program 103, from which it is further transferred to an input/output execution management program 104 which converts it into an input/output request to the disk controller 20A and sends it to the controller.

The OS 102 includes the process management program 105, the input/output access program 103 and the input/output execution management program 104. In response to a process request from the application program 101, these programs notify or set the state of the logical volume to the disk controller 20A according to the process management (e.g., process generation, schedule and deletion) and the input/output request.

A definition file 140 generated in an external storage device contains user defined information. This file defines rules by which to attach information representing a group of the update data to the input/output request issued from the process. Here is shown an example case where the definition file 140 is stored in an external storage device. It may be stored in the host computers 10A, 10B.

Running on the disk controller 20A are an input/output request receiving unit 112A, an input/output control component 113A and a data copy control component 114A. These functions are realized by the CPU 22 reading and executing programs stored in the memory 23.

The input/output request receiving unit 112A, when it receives the input/output request from the host computer 10A, checks its content and hands its control over to the input/output control component 113A or data copy control component 114A. Based on the input/output request received, the input/output control component 113A executes data input/output to and from the disk device 30A. The data copy control component 114A, based on the input/output request received, executes control on data copy to and from the disk controller 20B.

Transfer ports 115A and 115B are connecting paths to transfer the input/output request from the disk controller 20A to the disk controller 20B at the remote site via a communication line 150.

In the disk device 30A a plurality of logic volumes are set. Here, the logic volumes set in the disk device 30A at the main site are taken as main volumes, and the logic volumes in the disk device 30B at the remote site that store copies of files stored in the main volume are taken as sub volumes. It is also assumed that main volumes 121A, 122A store logically significant files and that copies of these files are stored in sub volumes 121B, 122B. The phrase "logically significant" means the following relation. For example, in a database for managing deposits in a bank, when data on accounts and data on their balances are stored in separate volumes, the relation between the volume storing the account data and the volume storing the balance data is referred to as being "logically significant". That is, although the contents of data differ, such as account information and balance information, they are referenced and updated by a single business application, process or task.

The disk controller 20A, when it receives a data write request from the host computer 10A, writes the write data into both the main volumes 121A, 122A and at the same time transfers the data to the disk controller 20B. The disk controller 20B writes the data received into the sub volumes 121B, 122B. The process of sending data from the main site to the remote site and generating copies of the data at the remote site is hereinafter called a remote copy.

The configurations of the host computer 10B and the disk controller 20B at the remote site are almost similar to those of the host computer 10A and the disk controller 20A at the main site.

Figure 3:
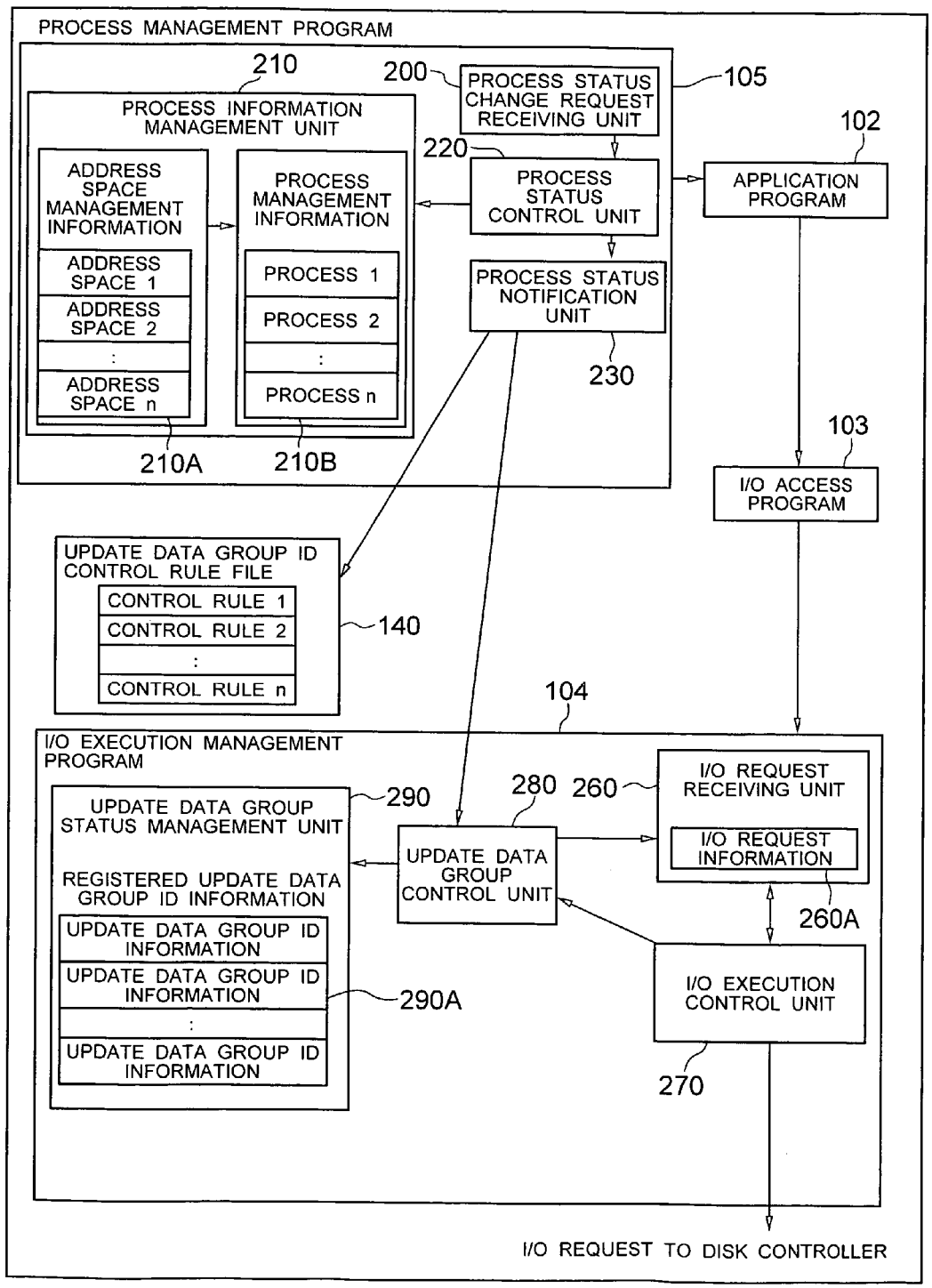
FIG. 3 is a diagram showing a functional linkage between a process management and an input/output execution management.

FIG. 3 shows operations of the process management program 105, the input/output access program 103, the input/output execution management program 104 and the update data group ID control rule file 140 all included in the OS 102 of the host computer 10A at the main site.

The process management program 105 has a process status change request receiving unit 200, a process status control unit 220, a process information management unit 210 and a process status notification unit 230.

The process status change request receiving unit 200, upon receiving a processing request from the host computer 10A, hands a requested category in the process status change over to the process status control unit 220. The requested category in the process status change includes, for example, a process generation and a process elimination and also a process state transition in which a process or task, upon receiving a processing request, shifts from the standby state to the execution state and, after completing the processing, returns to the standby state.

The process information management unit 210 has address space management information 210A to manage an address space where the process is executed, and also process management information 210B to manage an execution state of the process.

The process status control unit 220 checks the requested category retrieved from the process status change request receiving unit 200, executes a process control and an address space control, and transfers the information on the process state and the process state transition to the process status notification unit 230.

Based on the information on the process state or process state transition retrieved from the process status control unit 220 and on the definition information generated in the file 140 in the external storage device (hereinafter referred to as an update data group ID control rule), the process status notification unit 230 notifies an update data group control unit 280 in the input/output execution management program 104 whether the group identity information is to be registered with or deleted from the update request.

The input/output access program 103 receives an input/output request from the OS or application program and generates a series of input/output commands.

The input/output execution management program 104 includes an input/output request receiving unit 260, an input/output execution control unit 270, an update data group control unit 280 and an update data group status management unit 290.

The input/output request receiving unit 260 receives input/output request information 260A from the input/output access program 103.

The input/output execution control unit 270 performs control and execution of the input/output request according to information set in the input/output request information 260A and also assigns an update data group ID.

The update data group control unit 280 controls registration and deregistration of update data group ID information according to the result of a reference made to the input/output request receiving unit 260 about update data group ID information assignment and according to a request from the process status notification unit 230.

The update data group status management unit 290 manages the registered update data group ID information.

FIG. 4 shows an example of an update request for a file distributed among a plurality of volumes.

FIG. 4A is an example in which a single process in the main site host computer 10A makes an update request for database files 400A, 400B, 400C distributed among multiple volumes. The database files 400A, 400B, 400C are in the logically significant relation. Because they are rendered insignificant if they are not synchronized in terms of update state, the update states of the volumes 121A, 122A, 123A also need to be synchronized when these volumes are copied at the remote site.

The files 400A, 400B, 400C, when remote-copied by the main site computer 10A to the remote site, must have their update state synchronized.

FIG. 4B shows an example of a logically significant data file distributed among a plurality of volumes by the main site host computer 10A.

The volume 121A has files 411, 412, 413 to manage data set attributes, idle capacity information and information on increment data, and the volume 122A has management information 40V on the volume 121A. Data actually updated by the application program exists in the data files 421, 422, 423. Putting the file management information and the data files in separate volumes assures high reliability. In this case also, when these data files are copied to the remote site, their update states need to be synchronized.

Figure 5A:
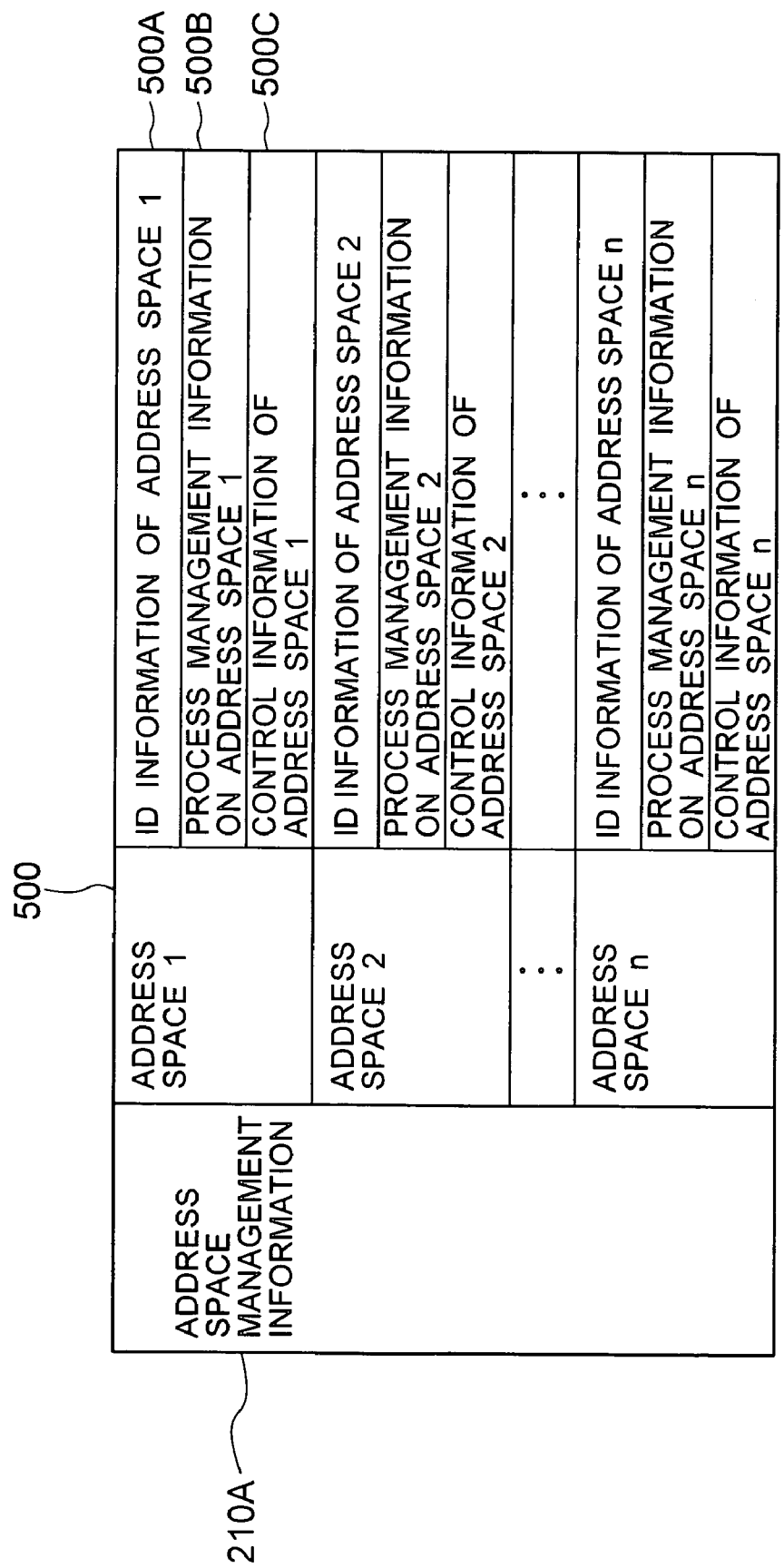
FIG. 5A shows an example structure of process management information (address space management information).

FIG. 5A shows details of the address space management information 210A managed by the process information management unit 210 of the process management program 105.

The address space management information 210A is control information to manage the address space in the memory that is used by the process during operation. This control information includes address space ID information 500A, process management information 500B in the address space, and address space control information 500C.

The address space ID information 500A represents an ID for the allocated address space.

The process management information 500B in the address space is set with management information of a process generated in the allocated address space. If a new process is to be generated in the already allocated address space, the associated management information is updated.

The address space control information 500C has system resources used by the address space as the management information.

FIG. 5B shows details of the process management information 210B managed by the process information management unit 210 in the process management program 105. The process management information 210B manages the generation and elimination of a process and the transition of process execution state, the state transition including a process execution state, an executable state and a standby state. The process management information 210B also manages the control information on the address spaces in which the process operates. The process management information 210B has process ID information 550A, process state management information 550B, process priority information 550C, process control information 550D, and process address space information 550E. The process ID information 550A is allocated to a process as an ID to identify the process when it is generated.

The process state management information 550B has information on process state and process state transition. The process priority information 550C is set with priority in executing a queue with which processes are registered for execution.

The process control information 550D is set with control information required for the execution of a program in response to a processing request. The process address space information 550E is set with information on identity of an address space in which the process operates.

Figure 6A:
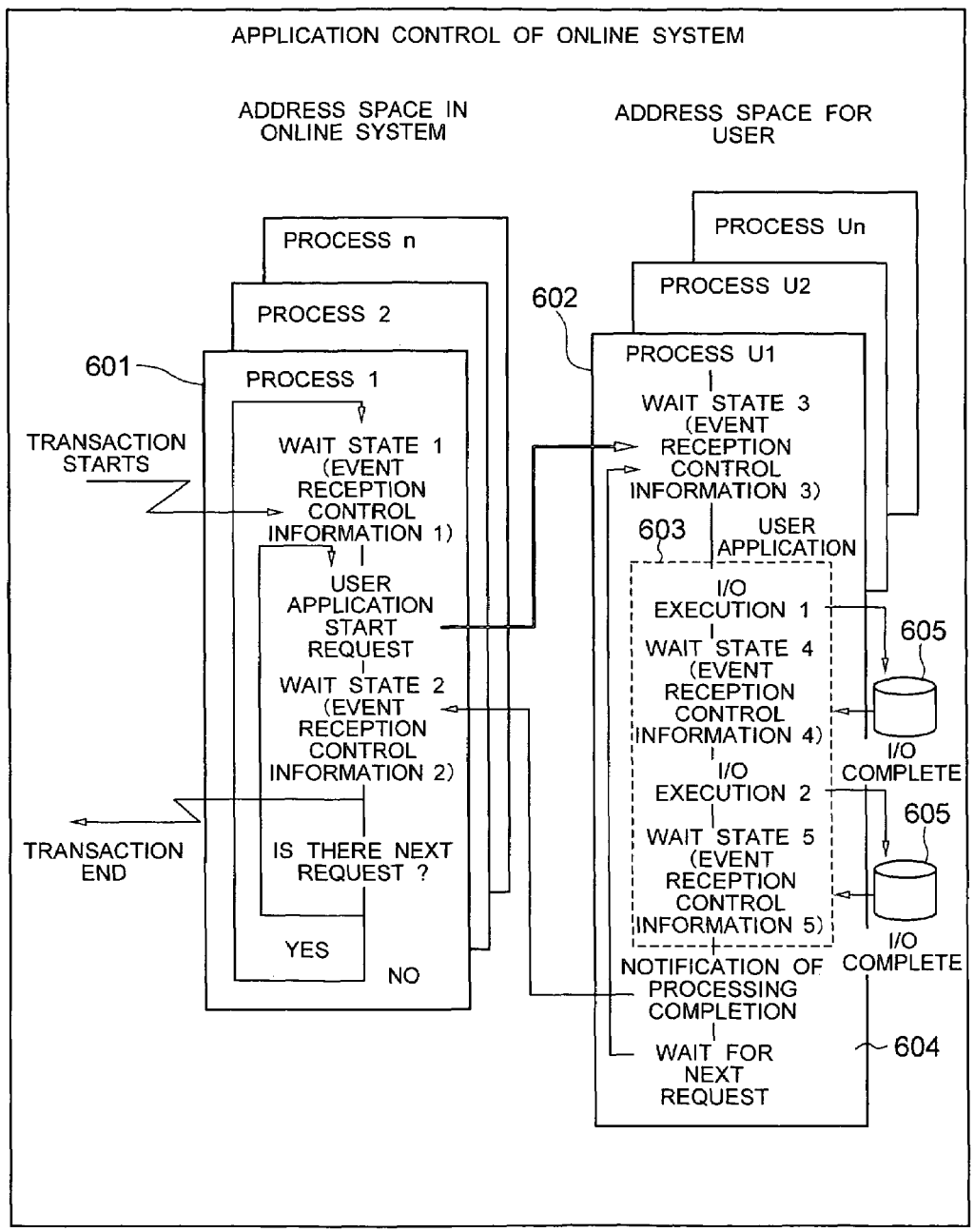
FIG. 6A is a schematic diagram showing an application control in an online system.

FIG. 6A is a schematic diagram showing an operation of processes associated with an application program control in the processing of an online program shown in Embodiment 1.

In an address space of an online system, processes (tasks) are generated in numbers corresponding to the number of user application programs and are waiting for a transaction start request. Also, processes for user application programs are generated and wait for a start request.

Processes prepare a control information area in the memory to receive a notification of even occurrence. Normally, a process is started upon receiving an event. For example, when a transaction start request for a user application program 603 occurs, an event occurrence is notified to event reception control information 1 for process 1. The process 1, upon receiving the event notification, moves from the standby state to an execution state.

Next, to activate the user application program 603, the process 1 notifies a start event occurrence to an application program start control 602 for process U1 and then waits in event reception control information 2 for an end event report from an end control 604. The user application program start control 602, when it receives at event reception control information 3 a start request for the user application program 603, starts the user application program 603.

The started user application program 603 at input/output execution 1 makes an input/output request to a logic volume 605 and waits at event reception control information 4 for a notification of completion of the input/output request. At this time, when updating logically significant information made up of a plurality of files, which are distributed among a plurality of volumes or spreads over a plurality of logical volumes, a plurality of input/output requests are made. So, the event reception control information 4 waiting for the completion of the input/output request is provided one for each of the multiple input/output requests.

When the input/output execution at the logical volume 605 is completed, the completion is notified to the event reception control information 4.

When the processing of the user application program 603 is completed, the application program end control 604 for process U1 reports the end event to the event reception control information 2 for process 1. Then, the process U1 waits for a start event at the event reception control information 3 in preparation for starting the next application program 603, and then the process transitions from the execution state to the standby state.

The process 1 that has received the application program end event at the event reception control information 2 reports the end of the transaction and, if there is another start request for the user application program 603, starts the application program 603. When no request for the next transaction is received, the process 1 transitions to a state where it waits at the event reception control information 1 for the next transaction start request.

To realize the grouping of input/output requests made by the application program 603, the status change (event reception control information 3) for the process U1 is monitored and a reference is made to the update data group ID control rule file.

FIG. 6B shows a status change of the process U1 for the user application program of FIG. 6A from when the process U1 receives an application start request until it returns the completion of the application program.

Upon receiving the start request from process 1, the process U1 transitions from the start request wait state to the execution state. In response to this status transition, update data group ID information is generated. With the update data group ID information generated, a series of input/output requests from the application that are processed under the control of the process U1 is given ID information (update data group ID) so that these input/output requests are executed as one group. After the input/output operations of the application program are finished and the application program ends, the process U1 transitions from the execution state to the start request wait state, waiting for the next start request. This status change is taken to be the end of a range to which the update data group ID information is allocated.

Figure 7A:
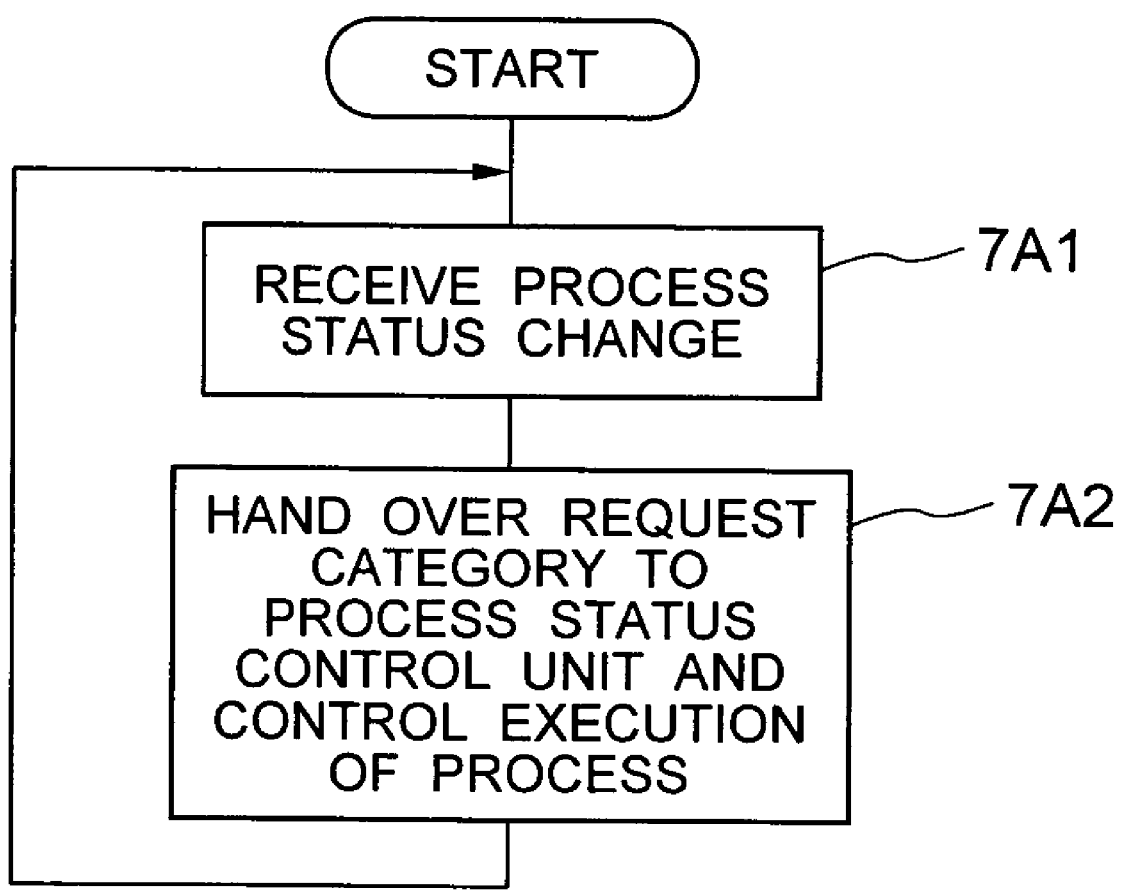
FIG. 7A is a flow chart showing details of processing performed by a process status change receiving unit 200.

FIG. 7A is a flow chart showing a sequence of steps performed by the process status change request receiving unit 200 in the process management program 105.

The process status change request receiving unit 200 receives a status change of process, such as generation and elimination of process (step 7A1). Then, the unit 200 hands the process request category over to the process status control unit 220 (step 7A2) for execution control of the process.

The process request category includes a generation request that is produced when a process is generated; an elimination request that is produced when a process is eliminated; an execution request that is produced when the event reception control information changes to an execution state when the process transitions from the wait state to the execution state; and a wait request that is produced when the event reception control information changes to a wait state when the process transitions from the execution state to the wait state.

Figure 7B:
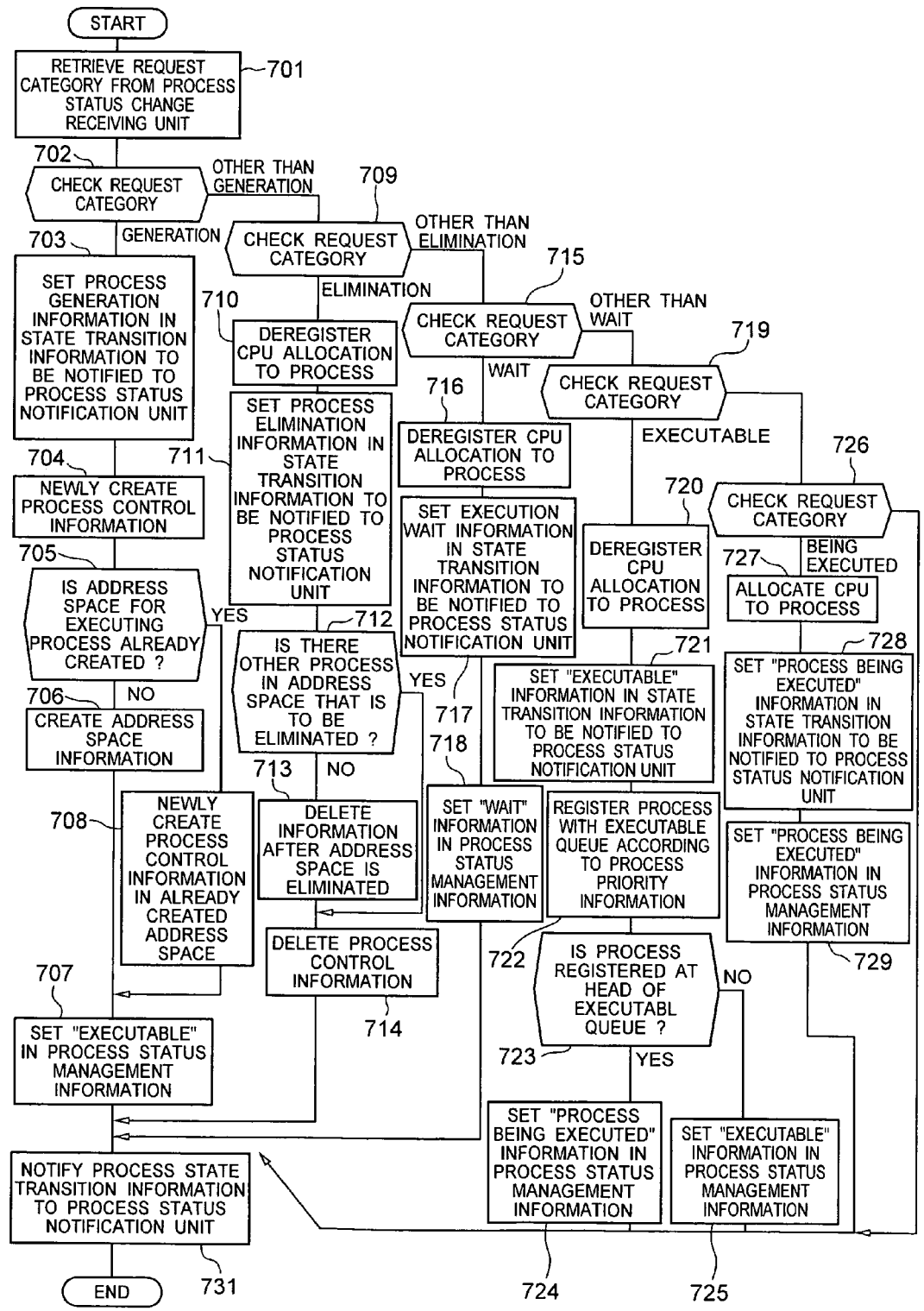
FIG. 7B is a flow chart showing details of processing performed by a process status control unit 220.

FIG. 7B is a flow chart showing a sequence of steps performed by the process status control unit 220 in the process management program 105.

According to the process request category received from the process status change request receiving unit 200, the process status control unit 220 controls the process.

The process status control unit 220 receives process request category from the process status change request receiving unit 200 (step 701). If the check of the request category (step 702) finds that it is a process generation, a process generation is set in process state transition information 1301 in state transition information 1300 to be transferred to the process status notification unit 230 (step 703). Next, process control information 550 is newly created (step 704). Then, when a new process is generated, a check is made as to whether an address space for executing that process already exists (step 705). If the address space does not exist, it is newly created (step 706) and information that the process is executable is set in the process state management information 550B in the control information 550 of the generated process (step 707). Then, the process state transition information 1301 of the state transition information 1300 is notified to the process status notification unit 230 (step 731) before terminating this sequence.

At step 705 if it is decided that the address space for executing the process is already created, new process control information is generated in that address space (step 708) to update the process state management information 550B in the address space. Then, information that the process is executable is set in the process state management information 550B (step 707) and the process state transition information 1301 of the state transition information 1300 is notified to the process status notification unit 230 (step 731) before terminating the sequence.

If step 702 finds that the request category is other than the process generation, step 709 makes a further check on the request category. If step 709 decides that the request category is the process elimination, the CPU allocation to the process to be eliminated (step 710) is canceled or reset. Next, the process elimination information is set in the process state transition information 1301 in the state transition information 1300 to be notified to the process status notification unit 230 (step 711). After this, it is checked whether other processes exist in the address space to be eliminated (step 712). If it is decided that no other processes exist, the address space of interest is eliminated and the management information 500 on the address space is also deleted (step 713). Then, the process control information 550 that was requested to be deleted is also eliminated (step 714). The process state transition information 1301 in the state transition information 1300 is notified to the process status notification unit 230 (step 731) before exiting the procedure.

If other processes still exist in the address space that is to be eliminated by step 712, the address space cannot be eliminated, so only the process of interest is deleted (step 714) and the process state transition information 1301 in the state transition information 1300 is notified to the process status notification unit 230 (step 731) before exiting the procedure.

If step 709 finds that the request category is other than the process elimination, a further check is made on the request category. If the request category is a state transition to the wait state, step 716 is executed. The wait state refers to the wait for an interrupt produced, for instance, as a result of input/output execution performed in response to the input/output request. At this time, the CPU allocation to the process of interest is reset (step 716) and the process state transition information 1301 in the state transition information 1300 to be notified to the process status notification unit 230 is set with process execution wait state information (step 717). Further, the process state management information 550B in the process control information 550 is also set to the process execution wait state (step 718) and the process state transition information 1301 in the state transition information 1300 is notified to the process status notification unit 230 (step 731) before exiting the procedure.

If step 715 finds that the request category is not the process execution wait, step 719 makes a further check on the request category. If the process is executable, step 719 is executed. The word "executable" refers to a state in which, with the process generation complete and a CPU allocated to it, the process can be executed at any time. The CPU allocation to the process is reset (step 720) and the process state transition information 1301 in the state transition information 1300 to be notified to the process status notification unit 230 is set with the process executable state (step 721). Next, according to the process priority information 550C set in the process control information 550, the process control information 550 is registered with an executable queue (step 722). The process priority information 550C represents a priority in process execution set by the system. Generally, if the priority level is high, the process is registered at the start of the execution queue for immediate execution. A check is made as to whether the process registered with the execution queue is placed at the head of the queue (step 723). If the process is at the head of the queue, the process is executed immediately, so the process state management information 550B in the process control information 550 is set to "process being executed" (step 724) and the process state transition information 1301 in the state transition information 1300 is notified to the process status notification unit 230 (step 736) before exiting the procedure.

If step 723 finds that the process registered with the execution queue is not at the head of the queue, the process state management information 550B in the process control information 550 is set with "process executable" (step 725). The process state transition information 1301 in the state transition information 1300 is notified to the process status notification unit 230 (step 731) before exiting the procedure.

If step 719 decides that the process request category is not the executable state, step 726 makes a further check on the request category. If the category is a process execution, a CPU is allocated to the process (step 727). The process state transition information 1301 in the state transition information 1300 to be notified to the process status notification unit 230 is set to "processing being executed" (step 728); the process state management information 550B is also set to "processing being executed" (step 729); and the process state transition information 1301 in the state transition information 1300 is notified to the process status notification unit 230 (step 731) before exiting the procedure.

Figure 8:
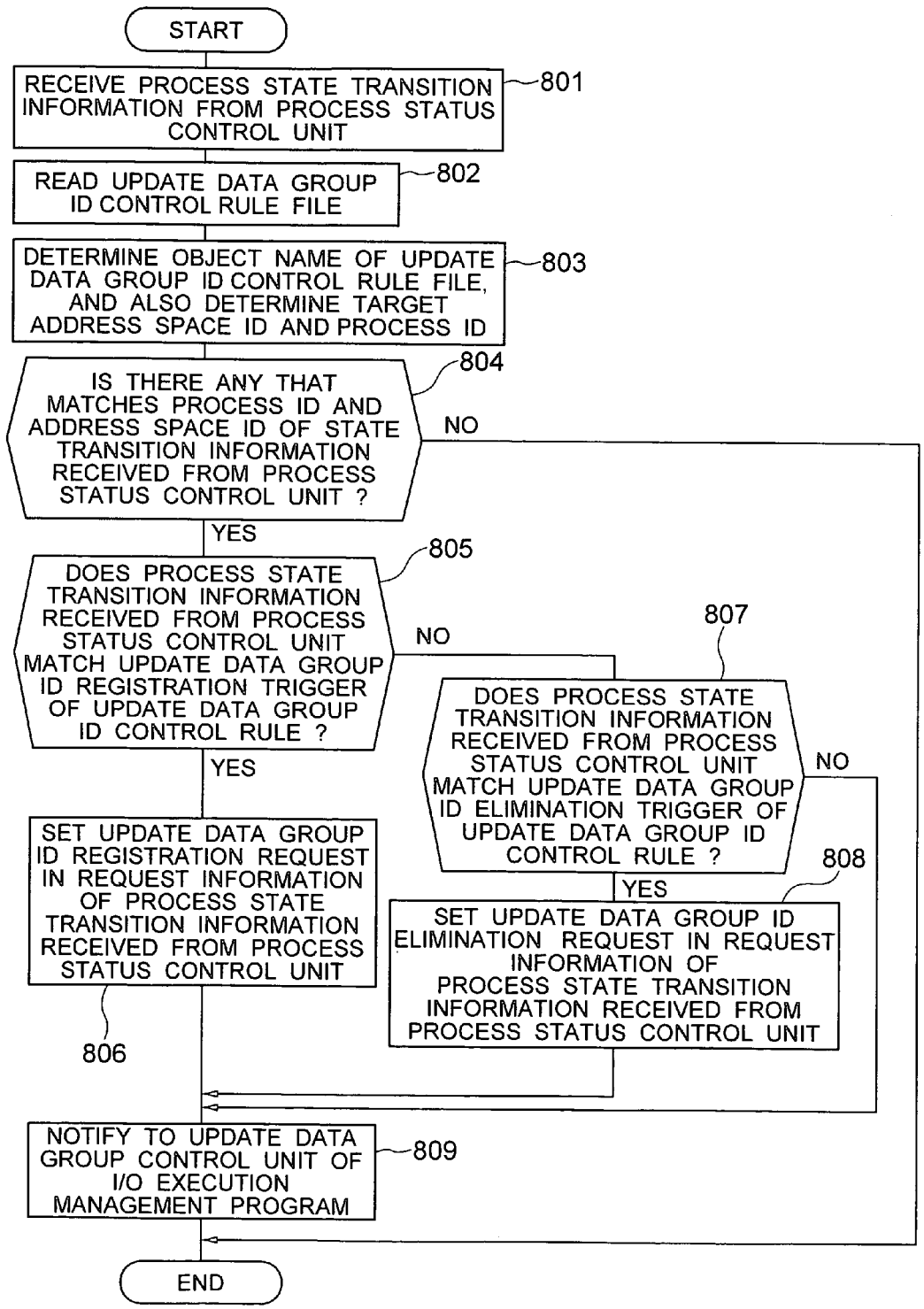
FIG. 8 is a flow chart showing details of processing performed by a process status notification unit 230.

FIG. 8 is a flow chart showing a sequence of steps performed by the process status notification unit 230 in the process management program 105.

The process status notification unit 230 retrieves the process state transition information 1300 as input information from the process status control unit 220 (step 801). Next, it reads the update data group ID control rule file 140 defined by the user (step 802). From the control rule 900 of the update data group ID control rule file 140 read out by step 802, an object name 903 is picked up. The unit 230 then retrieves information on the address space ID and process ID for the process management program 105 to execute the object name 903 (step 803). Next, the process ID information 1303 and address space ID information 1304 in the state transition information 1300 retrieved from the process status control unit 220 are compared with the address space ID information and process ID information obtained at step 803 to see if they agree (step 804). If they do not agree at step 804, the procedure is exited. If a plurality of control rules 900 are registered with the update data group ID control rule file 140, the above comparison is made for all registered rules.

If the comparison at step 804 finds any agreement, a check is made to see whether the process state transition information 1301 in the state transition information 1300 retrieved from the process status control unit 220 matches an update data group ID registration trigger 901 in the update data group ID control rule file 140 (step 805). It is decided that the state of agreement is established if information representing a "trigger by which the process changes from the standby state to the execution state" is set in the process state transition information 1301 and if information representing a "trigger for transition from the standby state to the execution state" is also set in the update data group ID registration trigger 901 in the update data group ID control rule file 140. As to the method for checking the agreement between information, there is no particular limitation. The comparison may be made by using the same code information or by using different code information. If there is a match at step 805, the information on the update data group ID registration request is set in request information 1302 in the state transition information 1300 retrieved from the process status control unit 220 (step 806).

Next, the result of operation is notified to the update data group control unit 280 in the input/output execution management program 104 (step 809) before exiting the procedure. If at step 805 there is no match, step 807 checks if the process state transition information 1301 in the state transition information 1300 retrieved from the process status control unit 220 matches an update data group ID deletion trigger 902 in the update data group ID control rule file 140 (step 807). If they fails to match, the procedure is exited. If there is a match at step 807, the request information 1302 in the process state transition information 1300 retrieved from the process status control unit 220 is set with an update data group ID deletion request (step 808). The result of operation is informed to the update data group control unit 280 (step 809) before exiting the procedure.

FIG. 9 shows a data structure of the update data group ID control rule file 140 of FIG. 8 defined by the user.

The control rule 900 comprises definition information for update data group ID registration trigger 901, definition information for update data group ID reset trigger, and an object name 903 to which the update data group ID information is attached for control. When a plurality of object names are used, a plurality of control rules are registered. The definition information for update data group ID registration trigger 901 is an information area indicating what transition state entered by the application's process and task represented by the object name 903 is the timing to register the update data group ID. The content of the information is not particularly specified in this embodiment. The definition information for update data group ID deletion trigger 902 is an information area indicating what transition state that the application's process and task represented by the object name 903 has entered is the timing to reset the update data group ID. The content of the information is not particularly specified in this embodiment.

The object name 903 is set with a name that identifies an application for which the update data group ID is to be registered or deregistered or with identity information that identifies such an application. This file is necessary in realizing the control of the update data group ID information and is an information definition file that controls registration and deregistration of the update data group ID and identifies the process of interest. In addition to being created in an external storage device, this file may be stored in a system memory.

FIG. 10 shows update data group ID information 290A managed by the update data group status management unit 290 in the input/output execution management program 104.

The update data group ID information 290A comprises information which, for example, identifies the process and address space in which the program is executed. This includes process ID information 1001 to identify the process in which the program is running, and address space ID information 1002 to identify the address space in which the program is running. There is no information area for unregistered update data group IDs. For deregistration, the registered information area itself is deleted. As for the update data group ID configuration, there is no limitation as long as it can identify the program process.

Figure 11:
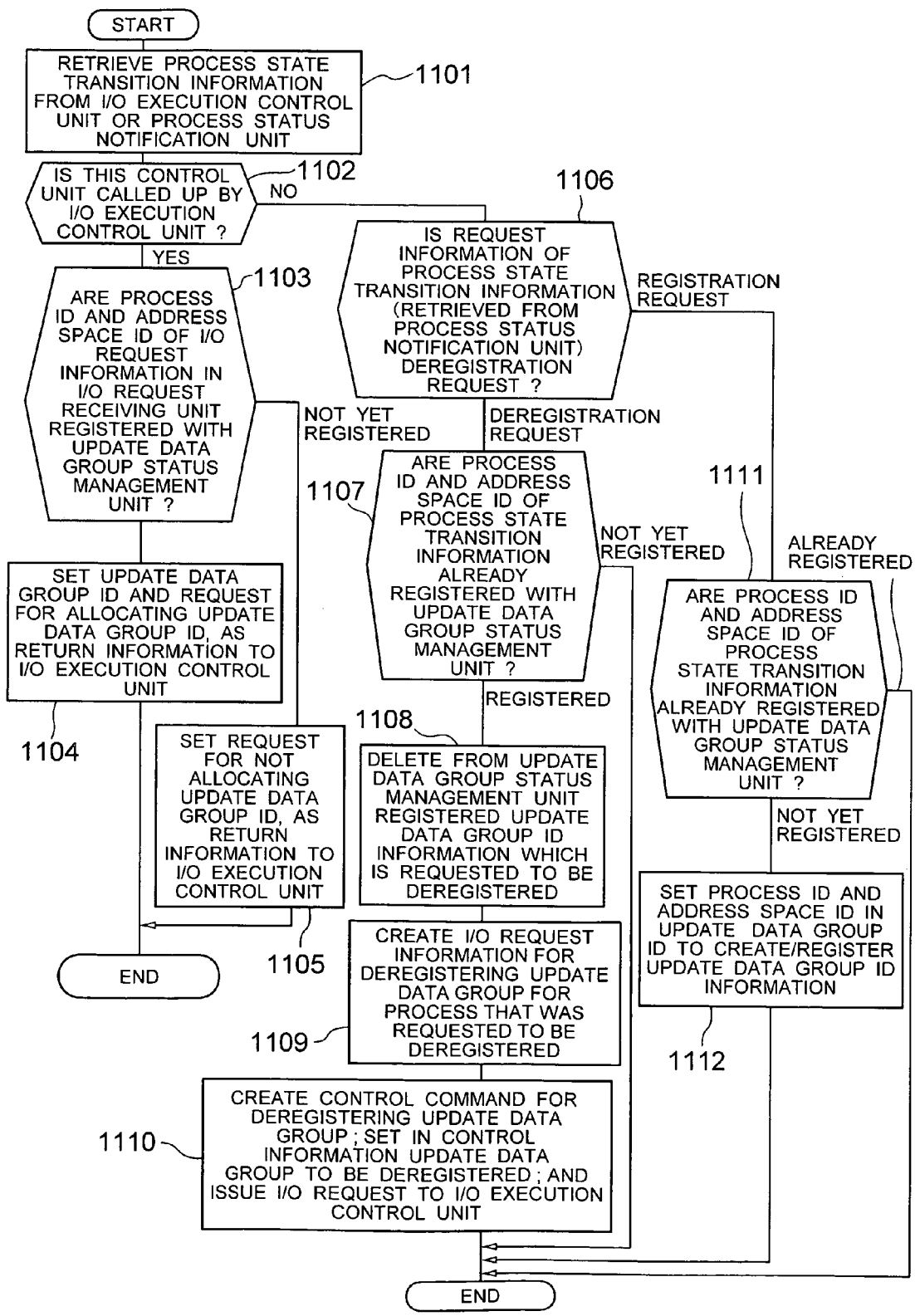
FIG. 11 is a flow chart showing details of processing performed by an update data group control unit 280.

FIG. 11 is a flow chart showing a sequence of steps performed by the update data group control unit 280 in the input/output execution management program 104.

The update data group control unit 280 is executed based on the process state transition information sent from the input/output execution control unit 270 or the process status notification unit 230 (step 1101). The execution of the update data group control unit 280 initiated from the input/output execution control unit 270 differs from that initiated from the process status notification unit 230 because of a difference in the processing nature between these units. So it is necessary to determine from which program the update data group control unit 280 has been initiated. Since the process state transition information received is attached with identity information of the input/output execution control unit 270 or the process status notification unit 230, the above check can be made using this identity information (step 1102).

When the process state transition information is received from the input/output execution control unit 270, a check is made as to whether the input/output request information 260A accepted at the input/output request receiving unit 260 is registered with the update data group (step 1103). The input/output request information 260A stores input/output request process ID information 1203 and input/output request execution address space ID information 1204. So, it is checked whether these information matches the update data group ID information 290A registered with the update data group status management unit 290. If they agree, it is decided that the input/output request information 260A is already registered. If the process ID information and address space ID information are already registered, an update data group ID allocation request and the update data group ID are set in return information 1400 (step 1104) which is sent from the update data group control unit 280 to the input/output execution control unit 270.

The return information 1400 comprises the update data group ID allocation request 1401 and update data group ID information 1402. If the step 1103 decides that the input/output request information 260A is not yet registered, since the update data group ID information 290A does not need to be given to the input/output update request, information indicating that the update data group ID is not allocated is set in the return information 1400 (step 1105) which is sent from the update data group control unit 280 to the input/output execution control unit 270. At this time, in the update data group ID information 1402 in the return information 1400 the update data group ID information 290A is not set.

When the process state transition information is received from the process status notification unit 230, a check is made to see if the request information 1302 in the state transition information 1300 retrieved from the process status notification unit 230 is a deregistration request or not (step 1106). If it is a deregistration request, a check is made as to whether the update data group ID information that matches the process ID information 1303 and address space ID information 1304 in the state transition information 1300 is registered with the update data group status management unit 290 (step 1107). If already registered, the update data group ID information that was requested to be deregistered is deleted from the update data group status management unit 290 (step 1108). Next, input/output request information 260A to notify the update data group ID information that was requested to be deregistered to the disk controller 20A is created (step 1109). Then, a command to deregister the update data group ID is generated and the update data group ID information is set in the control information of the command. An input/output request is then executed (step 1110).

After the update data group deregistration instruction has been issued and arrived at the disk controller 20B at the remote site, those update information with update data group ID, that are accumulated in the disk controller 20B at the remote site and match the update data group ID information set in the control information in the update data group deregistration instruction, are reflected en masse on the sub volumes (i.e., copied to the sub volumes).

If step 1107 decides that these update data group ID information are not registered in the update data group status management unit 290, the update data group control unit 280 does nothing but to execute the process status notification unit 230. If at step 1106 the request information 1302 is a registration request, it is checked whether the update data group ID information made up of the process ID information 1303 and the address space ID information 1304 in the state transition information 1300 is registered as the update data group ID information (step 1111). If not registered, the update data group ID made up of the process ID information 1303 and the address space ID information 1304 set in the state transition information 1300 is newly registered (step 1112). If step 1111 finds that they are already registered, the update data group control unit 280 does nothing but to execute the process status notification unit 230.

Figure 12A:
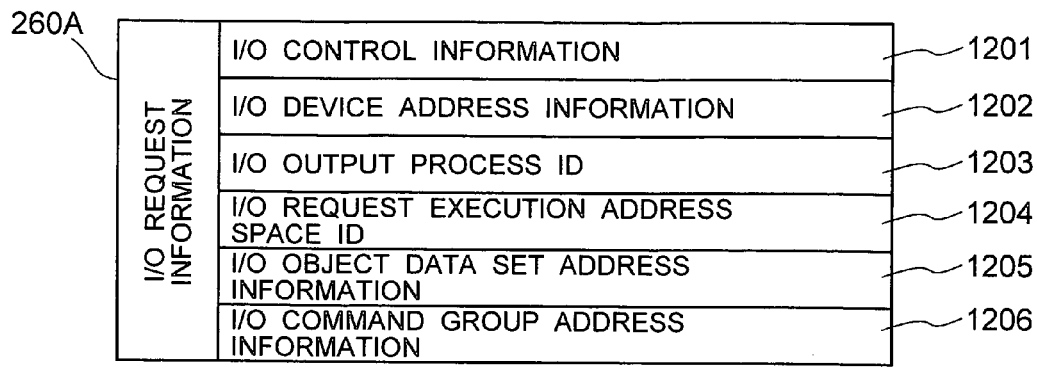
FIG. 12A illustrates an example structure of input/output request information.

FIG. 12A shows the input/output request information 260A managed by the input/output request receiving unit 260 in the input/output execution management program 104. The input/output request information 260A has input/output control information 1201, input/output device address information 1202, input/output request process ID information 1203, input/output request execution address space ID information 1204, input/output object file address information 1205, and input/output command group address information 1206.

The input/output control information 1201 is set with information for controlling the input/output operation and stores input/output execution results and control information such as input/output operation methods. The input/output device address information 1202 is set, for example, with a logical address of a device that makes an input/output request, and stores information that identifies a disk device. The input/output request process ID information 1203 stores process identity information used when the process is executed.

The input/output request execution address space ID information 1204 stores identity information of an address space used by a program as it is executed. The input/output object file address information 1205 stores address information of a file on the target input/output device for which an input/output request is made. The input/output command group address information 1206 stores addresses 207B of input/output commands from the input/output access program 103.

Figure 12B:
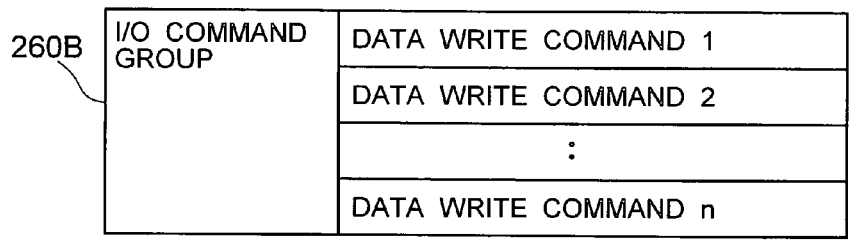
FIG. 12B illustrates an example structure of an input/output command group.

FIG. 12B shows an example of update input/output command group. The data update is executed by one or a series of two or more data write commands.

Figure 12C:
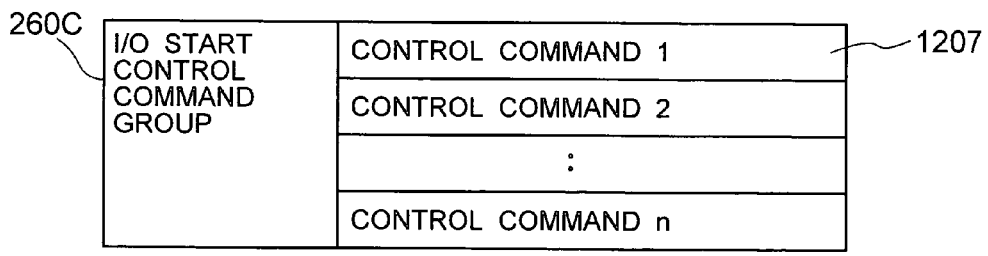
FIG. 12C illustrates an example structure of a control command group.

FIG. 12C shows input/output start control commands that the input/output execution control unit 270 issues prior to the operation of FIG. 12B. These control commands are used to set unique control information 260D to make an input/output request. For example, when data is written into a file by using commands of FIG. 12B, the input/output start control command group 260C is sent to an input/output control unit 1611 of the disk controller. If the control information of the control command group 260C is attached with update data group information 1211 shown in FIG. 12D, once a data copy control unit 1601 accepts the input/output command group 260B for data write, the successive data write requests will be attached with the update data group information before being executed.

Figure 12D:
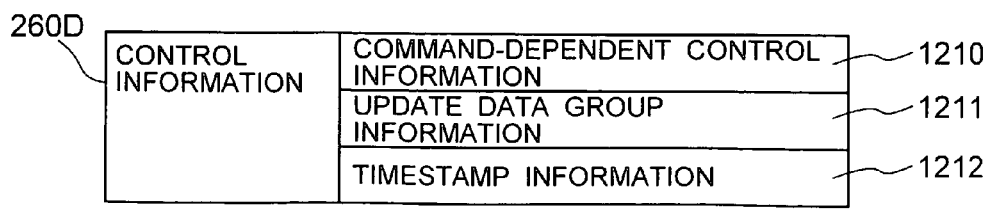
FIG. 12D illustrates an example structure of control information of the control command.

FIG. 12D shows an example configuration of the control command attached with update data group information. The control information 260D of the control command 1207 is attached with update data group information 1211 and timestamp information 1212 in addition to the existing control information 1210.

Figure 13:
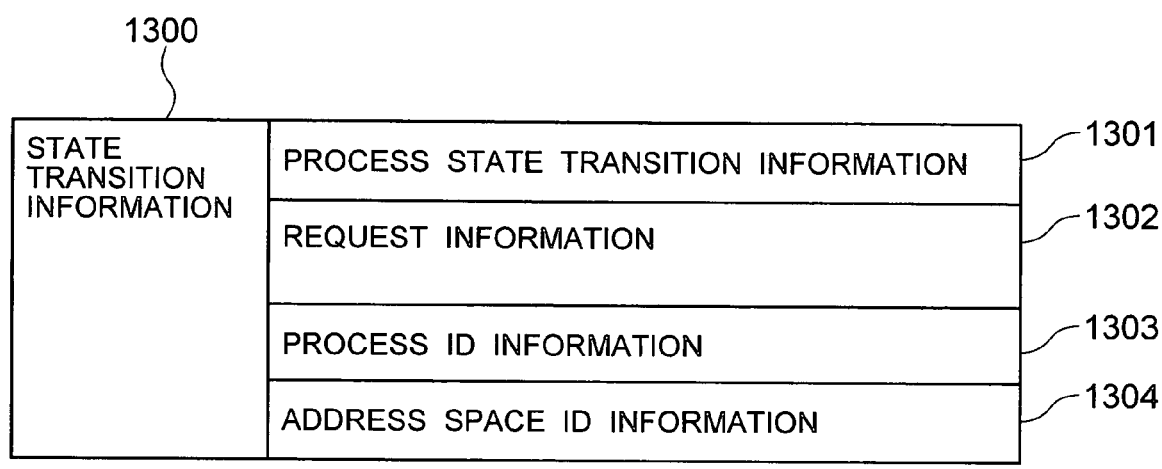
FIG. 13 illustrates an example structure of state transition information output from the process status control unit.

FIG. 13 shows state transition information generated by the process status notification unit 230 in the process management program 105.

The state transition information 1300 has process state transition information 1301, request information 1302, process ID information 1303, and address space ID information 1304. The state transition information 1300 is generated by the process status notification unit 230 as input information in executing the update data group control unit 280 in the input/output execution management program 104. The process state transition information 1301 is set by the process status control unit 220 according to the process state transition and is referenced by the process status notification unit 230. The request information 1302 is set by the process status notification unit 230 and is checked with the process state transition information 1301 set by the process status control unit 220 and with the update data group ID control rule file 140 defined by the user. After this, the request information 1302 is converted into the registration and deregistration request of the update data group ID information. This is referenced by the update data group control unit 280. The process ID information 1303 is checked with the update data group ID registered with the update data group status management unit 290 and is an identifier of the process. The address space ID information 1304 is checked with the update data group ID registered with the update data group status management unit 290 and is an identifier of the process.

Figure 14:
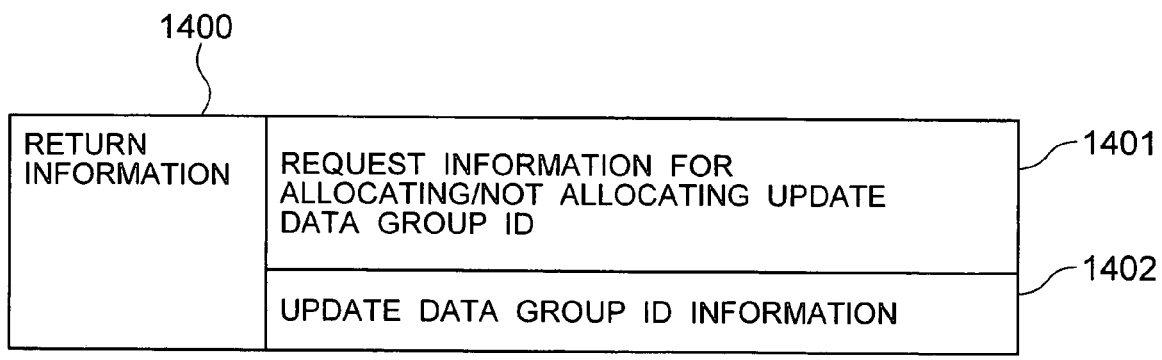
FIG. 14 illustrates an example structure of return information issued by the update data group control unit in the input/output execution management program.

FIG. 14 shows return information from the update data group control unit 280 in the input/output execution management program 104. The return information 1400 includes update data group ID allocation request information 1401 and update data group ID information 1402. If the result of execution of the update data group control unit 280 in the input/output execution management program 104 has found that the update data group ID information needs to be set in the control information 260D of the control command 1207, the request information 1401 calling for the allocation of the update data group ID is set. The update data group ID information 1402 is set with the update data group ID corresponding to the process ID information and the address space ID information when the update data group control unit 280 decides that the update data group ID needs to be allocated.

Figure 15:
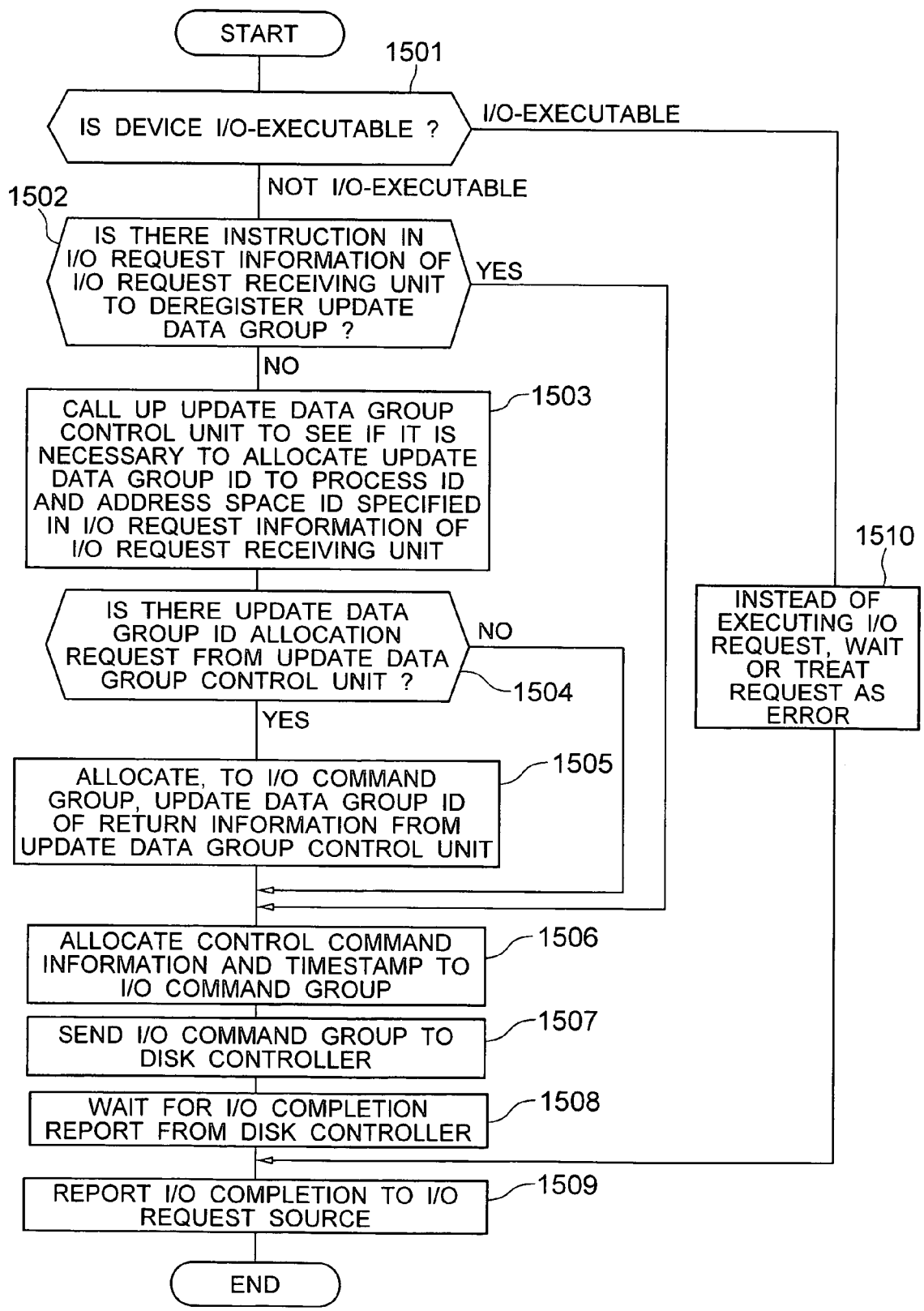
FIG. 15 is a flow chart showing details of processing performed by the input/output execution control unit.

FIG. 15 is a flow chart showing a sequence of steps performed by the input/output execution control unit 270 in the input/output execution management program 104.

The input/output execution control unit 270, prior to the execution of an input/output request, checks whether the target input/output device is in an executable state (step 1501). Whether the target device is executable is checked by the control information managing the device. The control information managing the input/output device is set with information indicating whether or not the device is input/output-executable. The input/output execution management program 104 checks this information in controlling the execution of the input/output operation. If the check result finds that the device is not input/output-executable, the input/output execution control unit 270 does not execute the input/output request and enters into a wait state or produces an error (step 1510).

If the step 1501 finds that the device is input/output-executable, it is checked whether there is an instruction in the input/output request information 260A in the input/output request receiving unit 260 that calls for a deletion of the update data group (step 1502). If there is an instruction, a timestamp is attached to the input/output command group (in the case of a deregistration request, only the control command) (step 1506) and the input/output command group is sent to the disk controller 20A (step 1507). The input/output execution control unit 270 executes the input/output request and waits for an input/output completion report (step 1508). Upon receiving the input/output completion report, the control unit notifies the completion to the input/output request source (step 1509).

If at step 1502 the request is found not to call for a deregistration of the update data group ID, the update data group control unit 280 is executed to check if the update data group ID information needs to be attached to the input/output request process ID information 1203 and input/output request execution address space ID information 1204 specified in the input/output request information 260A of the input/output request receiving unit 260 (step 1503). At this time, the state transition information 1300 is created as input information.

If the execution of the update data group control unit 280 (step 1504) finds that the request information 1401 in the return information 1400 calls for the update data group ID allocation, the update data group ID information in 1402 of the return information 1400 is attached to the control information 260D of the input/output start control command 1207 (step 1505). Next, a timestamp is attached to the control information 260D of the input/output command group (step 1506) and the input/output command group is sent to the disk controller (step 1507). The input/output execution control unit 270 executes the input/output request and waits for an input/output completion report (step 1508). Upon receiving the input/output completion report, the control unit 270 notifies the completion report to the input/output request source (step 1509).

Figure 16:
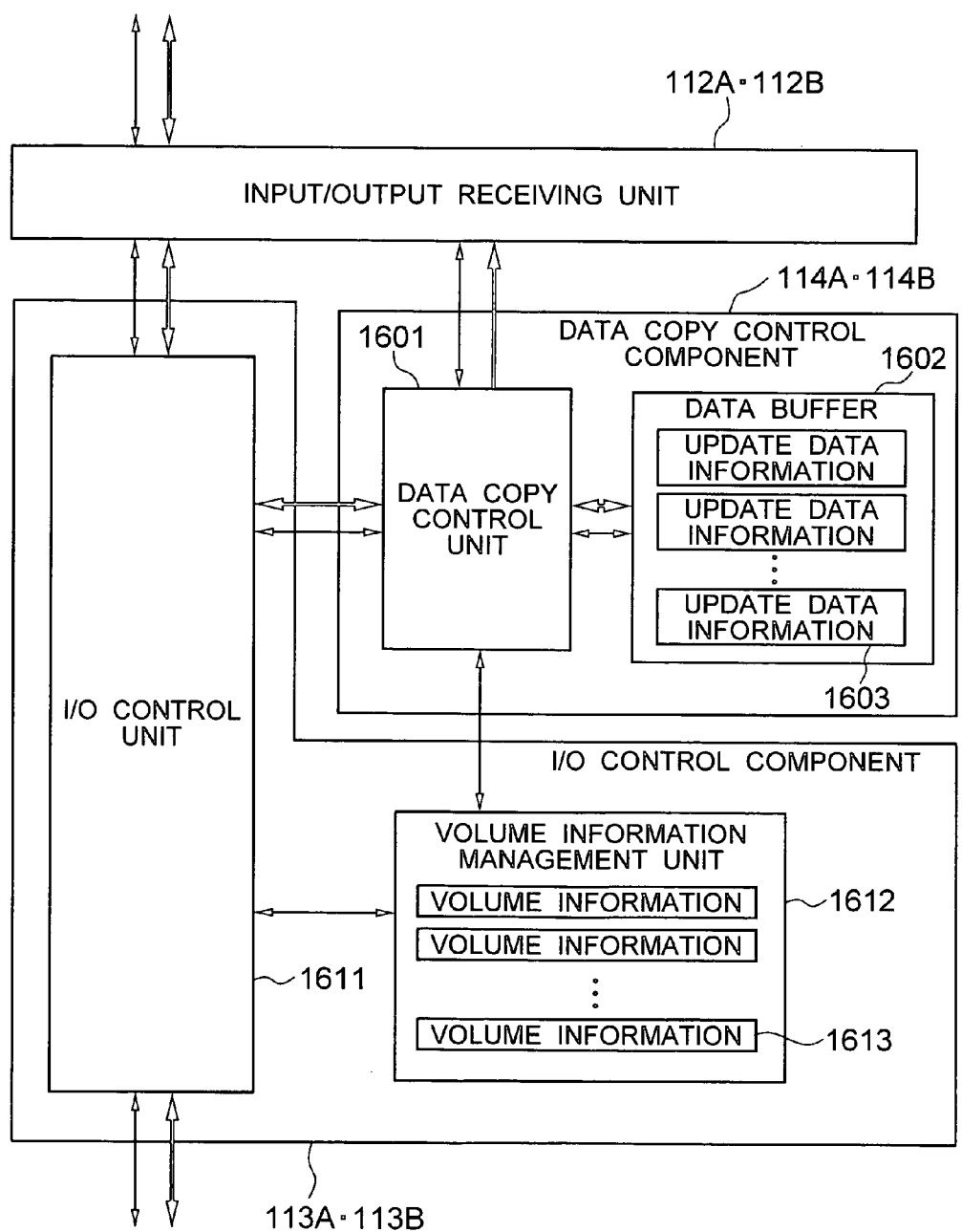
FIG. 16 is a schematic diagram showing an input/output receiving unit, an input/output control component and a data copy control component.

FIG. 16 shows details of a data copy control component 114 and an input/output control component 113 both making up the disk controllers 20A/20B.

The data copy control component 114 comprises a data copy control unit 1601 and a data buffer unit 1602. The input/output control component 113 comprises an input/output control unit 1611 and a volume status management unit 1612. The data buffer unit 1602 installed in the disk controller 20B at the remote site of remote copy converts the data update request attached with the update data group ID information into update data information 1603 before accumulating it.

The volume status management unit 1612 manages information on volumes (volume information 1613) in the disk controller. The data copy control unit 1601 controls the remote copy between the disk controllers. In the disk controller at the main site, the data copy control unit 1601 transfers the data update request and update data group end command to the disk controller 20B at the remote site. In the disk controller 20B at the remote site, the data copy control unit 1601 accumulates the update data information 1603 in the data buffer unit 1602 and, according to the update data group deregistration command, reflects the information of the data buffer unit 1602 on sub volumes at the remote site.

The input/output control unit 1611 receives commands through the input/output receiving unit 112 and executes them. In the disk controller 20A at the main site, the input/output control unit 1611 transfers the data update request and update data group end command to the data copy control unit 1601. In the disk controller 20B at the remote site, the input/output control unit 1611 transfers the data update request and update data group deregistration command to the data copy control unit 1601. The input/output control unit 1611 executes the data update request from the data copy control unit 1601 for the sub volumes at the remote site.

Figure 17A:
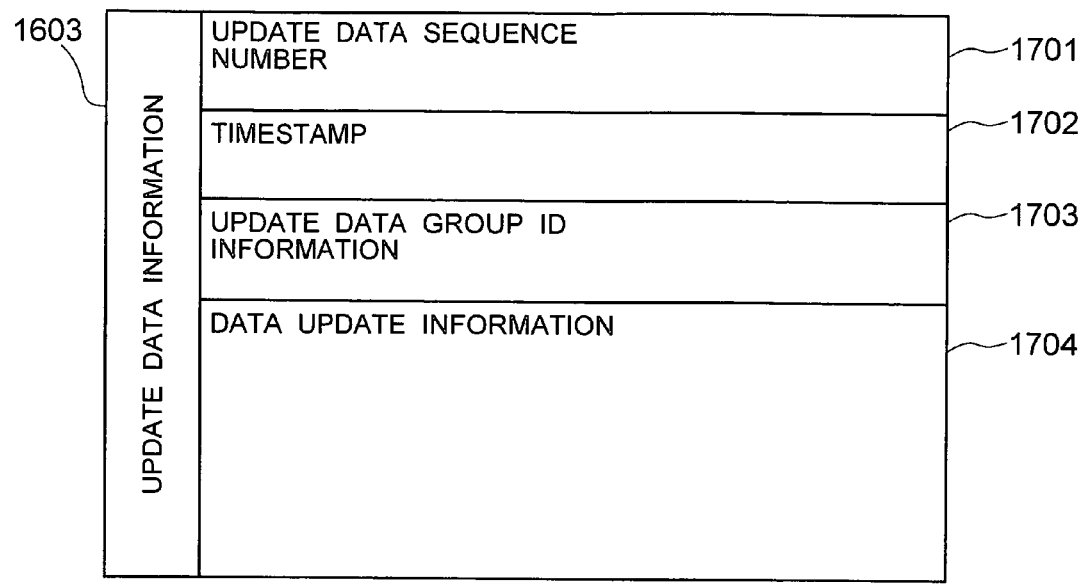
FIG. 17A illustrates a structure of update data information.

FIG. 17A shows update data information 1603 accumulated in the data buffer unit 1602. The update data information 1603 has an update data sequence number 1701 (a sequence number allocated by the disk controller at the main site to assure the data update order at the remote site); a timestamp 1702 (which may be used as is, as the update data sequence number); update data group ID information 1703 indicating which group update data information 1704 belongs to; and update data information 1704 including target update data and content to be updated.

Figure 17B:
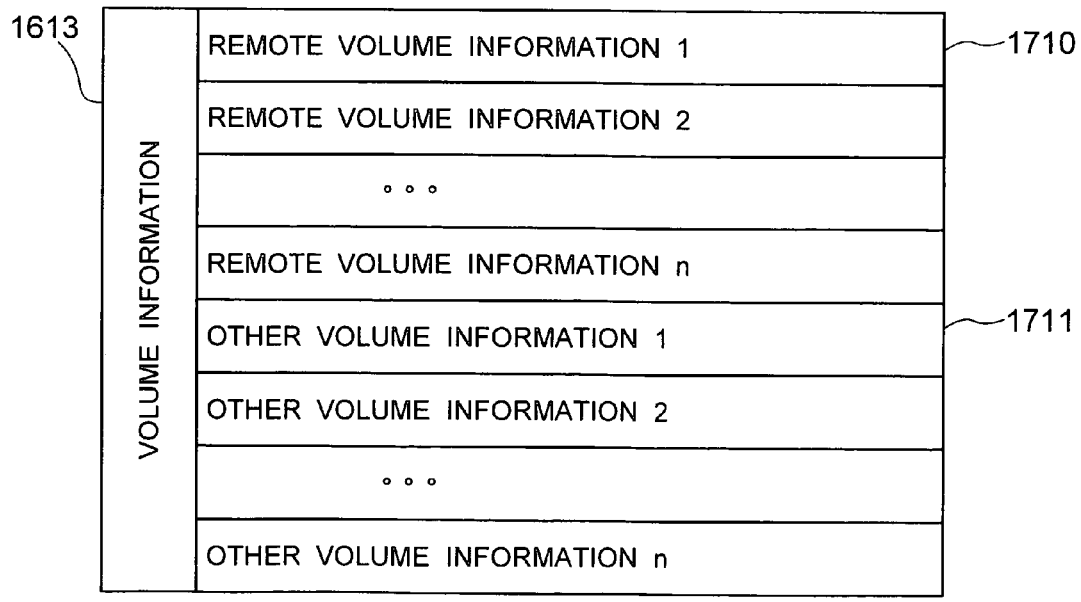
FIG. 17B illustrates a structure of volume information.

FIG. 17B shows details of volume information 1613 managed for each volume by the volume information management unit 1612. The volume information 1613 comprises remote volume information 1710 (information on sub volumes at the remote site as opposed to main volumes at the main site) and other volume information 1711 including various information to manage volumes (e.g., idle capacity in volumes and information on volume faults).

Figure 18:
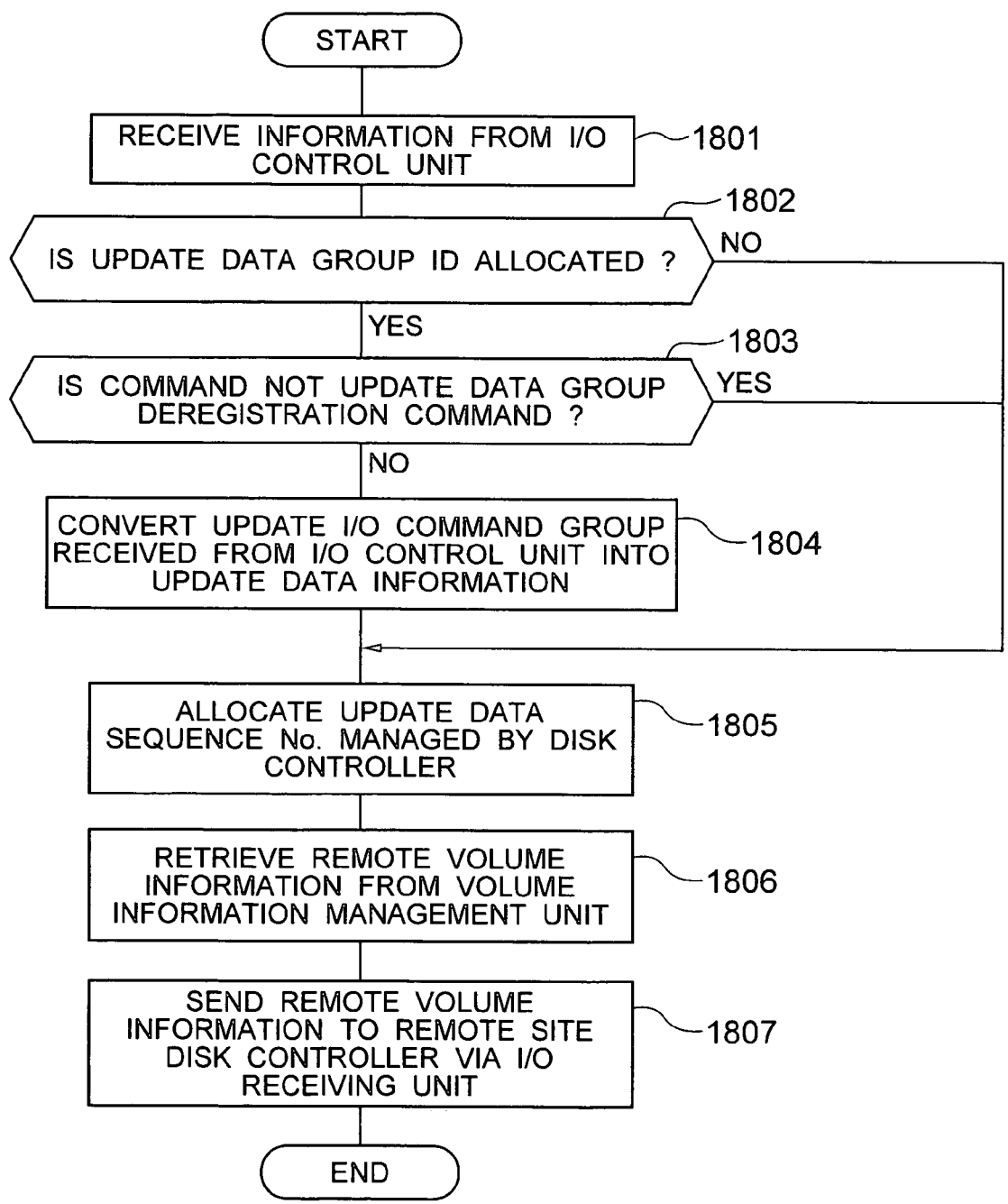
FIG. 18 is a flow chart showing details of processing performed by the data copy control unit in a disk controller at a main site.

FIG. 18 is a flow chart showing a sequence of control steps performed by the data copy control unit 1601 in the data copy control component 114A of the disk controller 20A at the main site.

The data copy control unit 1601, when it receives a command from the input/output control component 113A (step 1801), checks whether the received command is attached with an update data group ID (step 1802). If the command is found to have the update data group ID, another check is made to see if it is an update data group deregistration command (step 1803). If it is not the update data group deregistration command, the update input/output command group received from the input/output control unit 1611 of the input/output control component 113A is converted into the update data information 1603 (step 1804). Then, the update data sequence number 1701 managed by the disk controller 20A is allocated to the update data information 1603 (step 1805) and the remote volume information 1710 is retrieved from the volume status management unit 1612 (step 1806) and sent to the disk controller 20B at the remote site via the input/output receiving unit 112A (step 1807).

Figure 19:
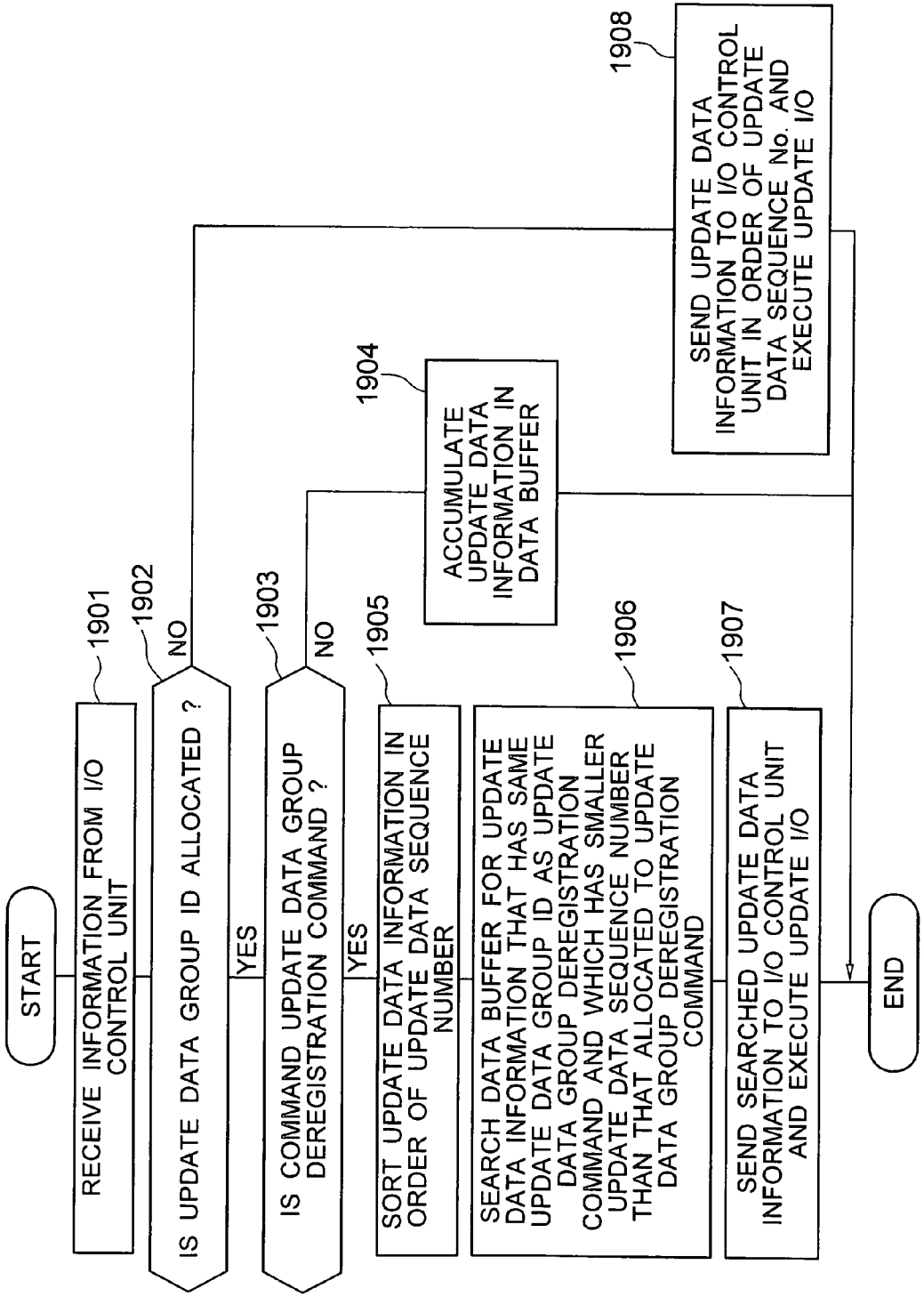
FIG. 19 is a flow chart showing details of processing performed by the data copy control unit in a disk controller at a remote site.

FIG. 19 is a flow chart showing a sequence of steps performed by the data copy control unit 1601 of the data copy control component 114B in the disk controller 20B at the remote site.

The data copy control unit 1601, when it receives a command from the input/output control unit 1611 (step 1901), checks if the received command is attached with the update data group ID (step 1902). If the command has the update data group ID, another check is made as to whether the command is an update data group deregistration command (step 1903). If it is found that the command is not the update data group deregistration command, the update data information 1603 is accumulated in the data buffer unit 1602 (step 1904). If the command is found to be the update data group deregistration command, the update data information 1603 accumulated in the data buffer unit 1602 are sorted out in the order of update data sequential number (step 1905). Then, a search is made through the data buffer unit 1602 for update data information that has the same update data group ID as the update data group deregistration command and whose update data sequential number is smaller than that attached to the update data group deregistration command (step 1906). The update data information 1603 that meet the conditions are sent to the input/output control unit 1611 to execute the data update (step 1907). If step 1902 finds that the received command is not attached with the update data group ID, the update data information is sent to the input/output control unit for executing the data update (step 1908). If at step 1902 the received command is found to be attached with the update data group ID, the data copy control unit 1601 sends to the input/output control unit 1611 only the update data information, without attaching the update data group ID to it, to execute the data update (step 1908).

Figure 20:
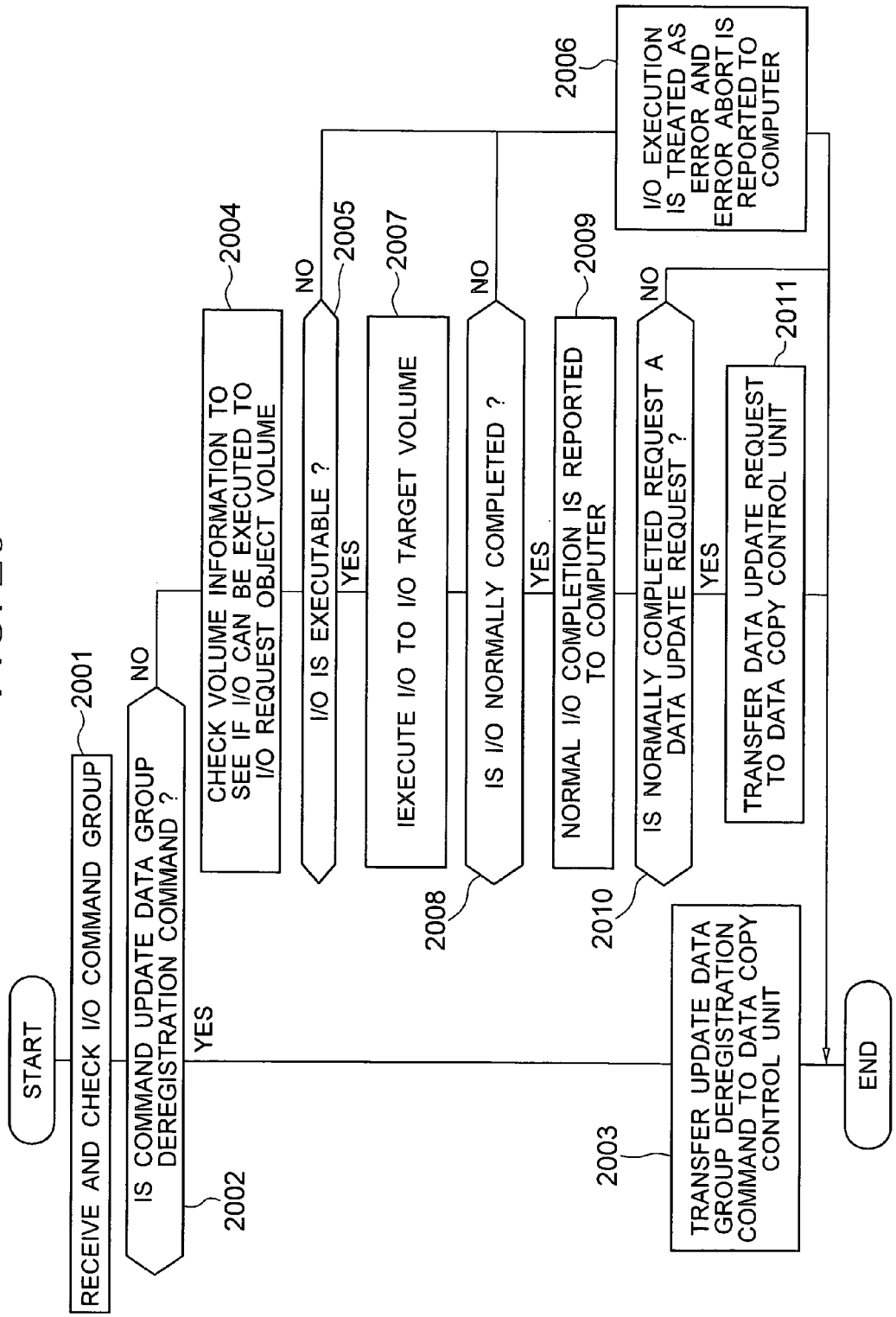
FIG. 20 is a flow chart showing details of processing performed by an input/output control unit in the disk controller at the main site.

FIG. 20 is a flow chart showing a control sequence of the input/output control unit 1611 of the input/output control component 113A in the disk controller 20A at the main site.

The input/output control unit 1611 receives and checks a command (step 2001) from the input/output request receiving unit 112A to see if the received command is an update data group deregistration command (step 2002). If the received command is an update data group deregistration command, the command is transferred to the data copy control unit 1601 (step 2003).

If the received command is not the update data group deregistration command, the volume information 1613 is checked to see if the input/output to and from the target input/output volume is executable (step 2004, step 2005). If it is found that the input/output is not executable, the input/output execution is treated as error and an error exiting is reported to the computer (step 2006). If the input/output is found to be executable, the input/output to and from the target volume is executed (step 2007). Then, the input/output control unit 1611 waits for the input/output to be finished and checks if the input/output is normally completed (step 2008). If the input/output ends abnormally, the execution of the input/output is treated as error and the error exiting is reported to the computer (step 2006). When the input/output ends normally, a normal exiting is reported to the computer (step 2009). Then, a check is made as to whether the normally completed request is a data update request (step 2010). If it is found to be the data update request, the data update request is transferred to the data copy control unit 1601 (step 2011).

Figure 21:
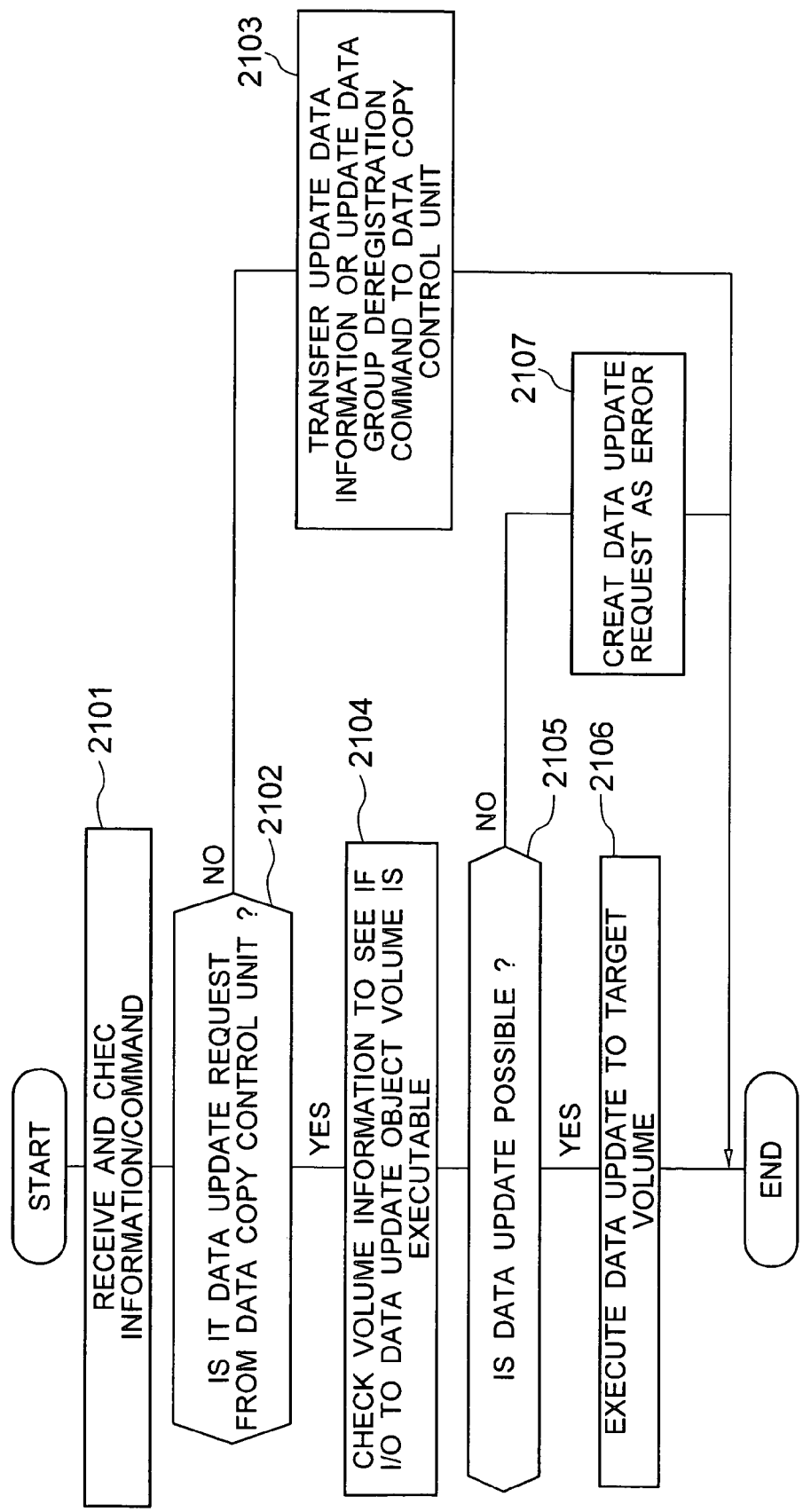
FIG. 21 is a flow chart showing details of processing performed by an input/output control unit in the disk controller at a remote site.

FIG. 21 is a flow chart showing a control sequence of the input/output control unit 1611 of the input/output control component 113B in the disk controller 20B at the remote site.

The input/output control unit 1611 receives and checks update data information and update data group end command either from the input/output receiving unit 112B or from the data copy control unit 1601 at the remote site (step 2101). A check is made as to whether the request/command is a data update request from the data copy control unit 1601 (step 2102). If the request is not from the data copy control unit 1601, the command/update data information is transferred to the data copy control unit 1601 (step 2104). If the data update request is from the data copy control unit 1601, the volume information 1613 is checked to see if the input/output to and from the target data update volume is executable (step 2104, 2105). If the data update is executable, the data update to the target volume is executed (step 2106). If the data update is not executable, the data update request is treated as error (step 2107).

Figure 22:
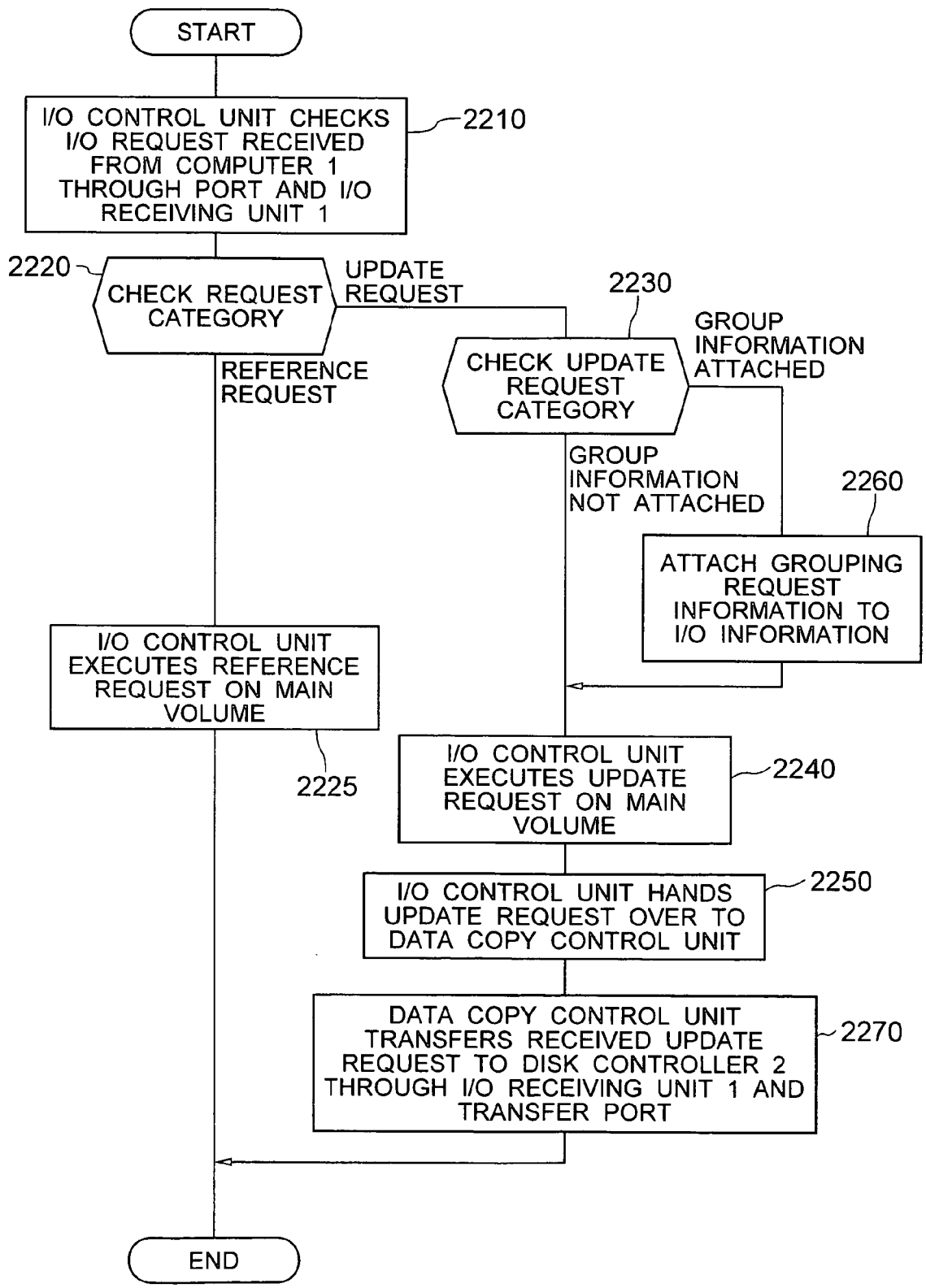
FIG. 22 is a flow chart showing an outline of processing performed by the disk controller at the main site.

FIG. 22 is a flow chart showing an outline sequence of steps performed by the disk controller 20A at the main site.

The input/output control unit 1611 checks an input/output request received through an input/output interface 111 and the input/output request receiving unit 112A (step 2210) and determines the request category (step 2220, 2230). If the request is found to be a reference input/output request, data is read from a main volume 121 and transferred to the host computer 10A through the input/output request receiving unit 112A and the input/output interface 111 (step 2225). If the request is found to be an update input/output request for a plurality of main volumes, data is written into the main volumes 121A, 122A (step 2250). If the request is an update input/output request or an update data group deregistration command, the request is handed over to the data copy control unit 1601. The data copy control unit 1601 transfers the received update input/output request to the disk controller 20B via the input/output request receiving unit 112A and a transfer port 115A (step 2270).

Figure 23:
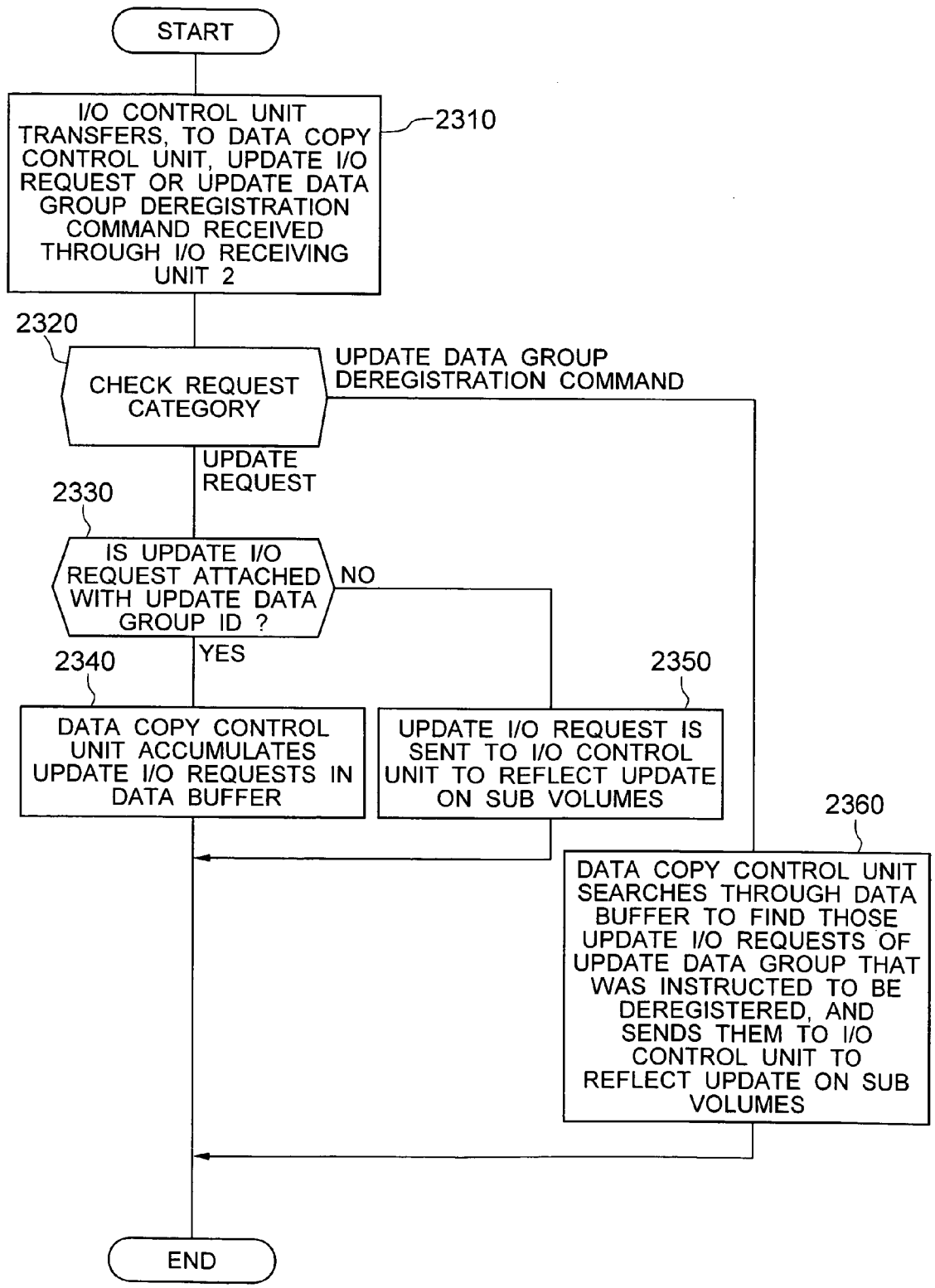
FIG. 23 is a flow chart showing an outline of processing performed by the disk controller at a remote site.

FIG. 23 is a flow chart showing an outline sequence of steps performed by the disk controller 20B at the remote site.

The input/output control unit 1611 hands over to the data copy control unit 1601 the update input/output request or the update data group deregistration command received through the input/output interface 111 and the input/output receiving unit 112B (step 2310). The data copy control unit 1601 checks if the received information is an update input/output request (step 2320). If it is found to be the update input/output request, a check is made as to whether the request is attached with an update data group ID (step 2330). If it has the update data group ID, the update input/output request is accumulated in the data buffer unit 1602 (step 2340). If not, the update input/output request is sent to the input/output control unit 1611 to reflect it on the sub volume (step 2350). If the request is the update data group deregistration command, this means that the update requests having the same update data group ID are completed at the time of reception. So, the data buffer unit 1602 is searched to find update input/output requests of the update data group that was instructed to be deregistered and these collected update input/output requests are sent to the input/output control unit 1611 to reflect them on the sub volume en masse (step 2360). Until the deregistration request arrives, the update data attached with the update data group ID information is not reflected on the sub volume.

As described above, in the first embodiment, when at the main site update input/outputs are executed on a plurality of main volumes 121A, 122A in the disk device 30A of the disk controller 20A by the process running on the host computer 10A, the update requests are given identity information belonging to the same update data group (the same update data group ID) so that update requests for a plurality of volumes can be handled as one update group. This allows the update requests for a plurality of volumes that are valid when seen from the host computer 10A to be set as one update group. In the disk controller 20B at the remote site, the request data with the same update data group ID are temporarily accumulated but not reflected (copied) to the sub volumes until the group deregistration request for the same update data group ID arrives. When the group deregistration request arrives, the update requests with the same update data group ID are stored en masse in the sub volumes 121B, 122B. This procedure ensures that the same update state as that of the plurality of volumes as seen from the host computer 10A is established at the remote site, so that even when a fault occurs at the main site, data stored in the sub volumes at the remote site can be synchronized in update state for each process and no updated data inconsistency occurs during data recovery. Further, it is possible to keep data failures and volume failures to the minimum.

Embodiment 2

An example configuration of the remote copy system of the second embodiment is the same as that of the first embodiment and shown in FIG. 1. What differs from the first embodiment is the control method that has different object names defined in the update data group ID control rule file 140.

FIG. 24 shows an example definition of the update data group ID control rule file 140.

The update data group ID control rule file 140 comprises an update data group ID registration trigger definition 2401, an update data group ID deregistration trigger definition 2402 and an object name 2403 that can identify a process for allocating update data group ID information. Actual content is defined by using information codes or names that can be recognized by the system.

The first embodiment is a case where the control is executed by specifying an online address space name. In the online address space, the process at the start or end of the transaction is received by the process status change request receiving unit 200 in the process management program 105. Then, the process status control unit 220 controls a process change at the start of transaction and, according to the rules in the update data group ID control rule file 140 defined by the user, performs registration and deregistration of the update data group ID information. Characteristics of the online transaction allows the registration and deregistration of the update data group ID information to be controlled by the external definitions according to the process change.

The embodiment 2 uses a definition method that specifies job names in the file 140.

In system operations there are predefined fixed work procedures and there may also be cases where job names to be executed are already determined. For example, routine backup procedure, recovery procedure and copying procedure execute routine jobs kept in a customer's resource. In these procedures, the second embodiment allows the control of registration and deregistration of update data group ID information for update input/output requests from a process specified by the job name.

In the case of embodiment 2, the allocation of the update data group ID information can be controlled during operation by specifying a job name in the object name 2403 of the update data group ID control rule file, allowing a fine control in a narrow sense of the word. When the job specified by its name is executed, the process status change receiving unit 200 receives a process generation request and, when the process is generated, registers the update data group ID information. The input/output requests from that process are given the update data group ID information that was registered at the time of process generation. When the process is eliminated, with all input/outputs from the job completed, an update data group ID deregistration is instructed according to the definition of the update data group ID deregistration trigger 2402. This assures the update state consistency even when a plurality of volumes are updated in each job execution.

An input/output method is provided which assures data consistency of a file spreading over a plurality of logically significant volumes or files distributed among a plurality of volumes. A storage subsystem at a main site handles as one group those input/output requests issued in a single process from a computer which call for data update on a plurality of logically significant volumes. The update request is executed on a plurality of volumes by group to implement the updating of volumes at a remote site en masse. It then becomes possible to accurately keep consistency of update among a plurality of files.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A data input/output method in an information processing system, wherein the information processing system includes:
   a first disk controller having a first disk device configured with a first group of logically significant logical volumes for storing data and a first control unit for controlling data update to the first disk device, said first group of logically significant logical volumes are synchronized in an update state to avoid being rendered insignificant;
   a host computer requesting an input/output of data to and from the first disk device; and
   a second disk controller having a second disk device configured with a second group of logically significant logical volumes for storing data and a second control unit for controlling a data update to the second disk device, said second group of logically significant logical volumes are synchronized in a remote-copying state to avoid being rendered insignificant;
   the data input/output method comprising the steps of:
   sending from the host computer to the first control unit for a process or task of an update request including a plurality of input/output requests each issued in said process or task and attached with information representing a group of update data stored in said first group of logically significant logical volumes, said process or task being a unit of processing by which an application program or system management is executed;
   sending the update request from the first control unit to the second control unit; and
   for each of the input/output requests attached with information representing the group of update data, causing the second control unit to temporarily accumulate the update data associated with the update request and, only until a group deregistration request is received, causing the second control unit to store in the second group of logically significant logical volumes all of the update data attached with the information representing the same group of update data.

2. A data input/output method according to claim 1, wherein the process or task is a processing to be executed, and the host computer generates, according to a state transition of the process or task, the update request attached with information representing the group of update data.

3. A data input/output method according to claim 1, wherein, based on a file defining a registration or deregistration of information representing a group of update data, the host computer sends update requests attached with information representing the group of update data.

4. A data input/output method according to claim 1, wherein, if the update request does not include identity information representing the group of update data, the second control unit stores the update data associated with the update request in the second logical volume.

5. A data input/output method according to claim 1, wherein identity information representing a group of update data is process identity information identifying a process or task and address space information.

6. A data input/output method according to claim 1, wherein the group deregistration request is to deregister the information representing the group of update data which includes an update data group ID.

7. A data input/output method according to claim 1, wherein the host computer has a process request category which includes a generation request that is produced when a process or task is generated, an elimination request that is produced when a process or task is eliminated, an execution request that is produced when the process or task transitions from a wait state to an execution state; and a wait request that is produced when the process or task transitions from the execution state to the wait state.

8. A data input/output method in an information processing system, wherein the information processing system includes:
a first disk controller having a first disk device configured with a first group of logically significant logical volumes for storing data and a first control unit for controlling a data update to the first disk device, said first group of logically significant logical volumes are synchronized in an update state to avoid being rendered insignificant;
a host computer requesting an input/output of data to and from the first disk device; and
a second disk controller having a second disk device configured with a second group of logically significant logical volumes for storing data and a second control unit for controlling data update to the second disk device, said second group of logically significant logical volumes are synchronized in a remote-copying state to avoid being rendered insignificant;
the data input/output method comprising the steps of:
sending from the host computer to the first control unit for a job of an update request including a plurality of input/output requests each issued in said job and attached with information representing a group of update data stored in said first group of logically significant logical volumes, said job being a unit of processing by which an application program or system management is executed;
sending the update request from the first control unit to the second control unit; and
for each of the input/output requests attached with information representing the group of update data, causing the second control unit to temporarily accumulate the update data associated with the update request and, only until a group deregistration request is received, causing the second control unit to store in the second group of logically significant logical volumes all of the update data attached with the information representing the same group of update data.

9. An information processing system comprising:
a host computer having an operating system, the operating system issuing a update request including a plurality of input/output requests allocated with a group of update data, the group being allocated to the update data in a process generated by an execution of an application program, said process being a unit of processing by which the application program is executed;
a second disk controller having a second disk device configured with a second group of logically significant logical volumes to store data and a second control unit, said second group of logically significant logical volumes are synchronized in a remote-copying state to avoid being rendered insignificant;
wherein the second control unit controls data update to the second disk device such that, for each of the input/output requests attached with information representing the group of update data, the second disk device temporarily accumulates the update data associated with the update request and that, only until a group deregistration request is received, the second disk device stores in the second group of logically significant logical volumes all of the update data attached with the information representing the same group; and
a first disk controller having a first disk device configured with a first group of logically significant logical volumes for storing data and a first control unit, said first group of logically significant logical volumes are synchronized in an update state to avoid being rendered insignificant;
wherein the first control unit stores in the first logical volume the update data associated with the input/output requests sent from the host computer and sends to the second disk device the input/output requests and the group deregistration request sent from the host computer.

10. An information processing system according to claim 9, wherein, based on a file defining a registration or deregistration of information representing the group of update data, the operating system of the host computer generates the input/output requests attached with information representing the group of update data.

11. An information processing system according to claim 9, wherein, if the input/output requests do not include identify information representing the group of update data, the second control unit stores the update data associated with the input/output requests in the second logical volume.

12. An information processing system according to claim 9, wherein the identity information representing the group of update data is process identity information to identify a process or task and address space information.

13. An information processing system comprising:
a host computer having an operating system, the operating system issuing a update request including a plurality of input/output requests allocated with a group of update data, the group being allocated to the update data in a job generated by an execution of an application program, said job being a unit of processing by which the application program is executed;
a second disk controller having a second disk device configured with a second group of logically significant logical volumes to store data and a second control unit, said second group of logically significant logical volumes are synchronized in a remote-copying state to avoid being rendered insignificant;
wherein the second control unit controls data update to the second disk device such that, for each of the input/output requests attached with information representing the group of update data, the second disk device temporarily accumulates the update data associated with the update request and that, only until a group deregistration request is received, the second disk device stores in the second group of logically significant logical volumes all of the update data attached with the information representing the same group; and a first disk controller having a first disk device configured with a first group of logically significant logical volumes for storing data and a first control unit, said first group of logically significant logical volumes are synchronized in an update state to avoid being rendered insignificant;

wherein the first control unit stores in the first logical volume the update data associated with the input/output requests sent from the host computer and sends to the second disk device the input/output requests and the group deregistration request sent from the host computer.

* * * * *